United States Patent
Goupil et al.

(10) Patent No.: US 11,287,283 B2
(45) Date of Patent: Mar. 29, 2022

(54) METHOD AND DEVICE FOR MONITORING AND ESTIMATING PARAMETERS RELATING TO THE FLIGHT OF AN AIRCRAFT

(71) Applicants: Airbus Operations S.A.S., Toulouse (FR); Office National d'Etudes et de Recherches Aerospatiales (ONERA), Palaiseau (FR)

(72) Inventors: Philippe Goupil, Beaupuy (FR); Martin Delporte, Fonsorbes (FR); Cedric Seren, Frouzins (FR); Georges Hardier, Balma (FR); Guillaume Alcalay, Toulouse (FR)

(73) Assignees: Airbus Operations S.A.S.; Office National d'Etudes et de Recherches Aerospatiales (ONERA)

( * ) Notice: Subject to any disclaimer, the term of this patent is extended or adjusted under 35 U.S.C. 154(b) by 856 days.

(21) Appl. No.: 15/980,991

(22) Filed: May 16, 2018

(65) Prior Publication Data
US 2018/0340795 A1    Nov. 29, 2018

(30) Foreign Application Priority Data
May 23, 2017   (FR) ...................... 17 54549

(51) Int. Cl.
*G01C 23/00*      (2006.01)
*G05B 23/02*      (2006.01)
(Continued)

(52) U.S. Cl.
CPC ........... *G01C 23/005* (2013.01); *B64D 43/02* (2013.01); *G01C 5/005* (2013.01); *G01C 9/005* (2013.01);
(Continued)

(58) Field of Classification Search
CPC ...... G01C 23/005; G01C 5/005; G01C 9/005; B64D 43/02; G05B 17/02; G05B 23/0254
See application file for complete search history.

(56) References Cited

U.S. PATENT DOCUMENTS 4,825,374 A * 4/1989 King .................... G01C 23/005
                                                     244/186
5,432,816 A * 7/1995 Gozzo ............... H04L 25/03076
                                                     363/131
(Continued)

FOREIGN PATENT DOCUMENTS

FR        2 988 833 A1    10/2013

OTHER PUBLICATIONS

M. Darouach, Extension of Minimum Variance Estimation For Systems with Unknown Inputs, Science Direct, Automatica, 39, pp. 867-876, (Oct. 22, 2003).*

(Continued)

*Primary Examiner* — Jean Paul Cass
(74) *Attorney, Agent, or Firm* — Lerner, David, Littenberg, Krumholz & Mentlik, LLP

(57) ABSTRACT

A device for monitoring and estimating parameters relating to the flight of an aircraft includes an estimation module 4 for determining an estimation of the values of the parameters relating to the flight of the aircraft and for generating residues, a detection module for determining the statuses associated with each of said sensors C1, C2, . . . , CN and with a parameter P1 corresponding to the weight of the aircraft, a transmission module for transmitting the statuses associated with each of said sensors C1, C2, . . . , CN to a user device and, on the next iteration, to the estimation module.

12 Claims, 4 Drawing Sheets

(51) Int. Cl.
    *G05B 17/02*      (2006.01)
    *B64D 43/02*      (2006.01)
    *G01C 5/00*      (2006.01)
    *G01C 9/00*      (2006.01)

(52) U.S. Cl.
    CPC ......... *G05B 17/02* (2013.01); *G05B 23/0254* (2013.01); *G01C 23/00* (2013.01)

(56) References Cited

U.S. PATENT DOCUMENTS

| | | | | |
|---|---|---|---|---|
| 5,761,625 | A * | 6/1998 | Honcik | G06F 9/45508 340/963 |
| 7,059,782 | B2 * | 6/2006 | Nikonov | G02B 6/24 385/43 |
| 8,914,164 | B1 * | 12/2014 | Nathan | G01P 3/50 701/7 |
| 9,096,330 | B2 * | 8/2015 | Nathan | G01P 21/00 |
| 10,121,384 | B2 * | 11/2018 | Hale | G08G 5/0021 |
| 10,202,204 | B1 | 2/2019 | Daidzic | B64D 45/08 |
| 10,502,584 | B1 * | 12/2019 | Suiter | G07C 5/0816 |
| 10,661,902 | B1 * | 5/2020 | Tavshikar | G06N 5/046 |
| 10,818,192 | B2 * | 10/2020 | Chen | G06Q 10/04 |
| 10,843,690 | B2 * | 11/2020 | Shalev-Shwartz | B60W 40/105 |
| 2001/0056316 | A1 * | 12/2001 | Johnson | G08G 5/045 701/14 |
| 2002/0188587 | A1 * | 12/2002 | McGreevy | G06F 16/3335 |
| 2009/0042511 | A1 * | 2/2009 | Malladi | H04L 5/023 455/62 |
| 2009/0240390 | A1 * | 9/2009 | Nenadic | G05B 23/0251 701/29.1 |
| 2009/0299496 | A1 * | 12/2009 | Cade | G05B 17/02 700/29 |
| 2009/0327204 | A1 * | 12/2009 | Gilhuly | A61B 5/4821 706/54 |
| 2010/0305781 | A1 * | 12/2010 | Felix | G01C 23/005 701/3 |
| 2012/0299753 | A1 * | 11/2012 | Thoreen | G01C 23/005 340/975 |
| 2014/0090456 | A1 | 4/2014 | Meisner et al. | |
| 2015/0052994 | A1 * | 2/2015 | Dupont De Dinechin | G01P 13/025 73/180 |
| 2015/0054664 | A1 * | 2/2015 | Dupont De Dinechin | B64D 43/00 340/973 |
| 2015/0057960 | A1 * | 2/2015 | Dupont De Dinechin | G01P 5/16 702/98 |
| 2015/0094982 | A1 * | 4/2015 | Dupont De Dinechin | G01G 19/414 702/175 |
| 2015/0233730 | A1 | 8/2015 | Guillet et al. | |
| 2016/0290826 | A1 | 10/2016 | Brenner et al. | |
| 2016/0298985 | A1 * | 10/2016 | Genito | G01C 23/00 |
| 2018/0340795 | A1 * | 11/2018 | Goupil | B64D 43/02 |
| 2018/0376305 | A1 * | 12/2018 | Ramalho de Oliveira | G08G 1/096775 |
| 2018/0376306 | A1 * | 12/2018 | Ramalho de Oliveira | G08G 1/0967 |
| 2020/0290742 | A1 * | 9/2020 | Kumar | B64D 27/24 |
| 2020/0309810 | A1 * | 10/2020 | Carvalho | G01C 23/00 |
| 2020/0311580 | A1 * | 10/2020 | Tavshikar | G06N 20/00 |
| 2021/0064043 | A1 * | 3/2021 | Kulkarni | H04W 84/18 |

OTHER PUBLICATIONS

Ye Zhou *, Erik-Jan van Kampen, Qi Ping Chu Delft University of Technology, Kluyverweg 1, 2629HS Delft, The Netherlands, Incremental model based online dual heuristic programming for nonlinear (2018).*

* cited by examiner

METHOD AND DEVICE FOR MONITORING AND ESTIMATING PARAMETERS RELATING TO THE FLIGHT OF AN AIRCRAFT

FIELD OF THE INVENTION

The present invention relates to a method and an associated device for monitoring and estimating parameters relating to the flight of an aircraft in real time.

BACKGROUND OF THE INVENTION

The correct operation of an aircraft is partly guaranteed by that of the sensors. They supply information on its attitude, its trajectory, its speed, etc., and make it possible to ensure the navigation, the guidance and the control thereof via control laws and automatic control algorithms. The high levels of automation that are possible these days on some aircraft depend on the availability of these sensors. These days, any loss of information following sensor failures involves the pilots more in the control of the aircraft, which increases their workload. In order to simplify the piloting task, it is therefore necessary to extend the availability of the flight parameters and do so throughout the duration of the flight. This means using a step of validation of the quality of the information supplied by the sensors, called "monitoring".

In order to ensure a better monitoring of the sensors and to increase the availability of the flight parameters in case of failure, two types of approaches have been tackled.

A first type of approach corresponds to the use of hardware redundancies, that is to say the use of several sensors of the same type in order to allow the identification of failure via in particular a majority-based vote (for example an average calculation or the choice of the median value). This first type of approach entails multiplying the number of embedded sensors, which in the case of aircraft with little instrumentation is unrealistic. In addition, in case of coherent and perfectly simultaneous failures of different sensors, the majority-based vote does not allow a fault to be identified. This is then called a common failure mode.

A second type of approach corresponds to the use of analytical redundancy. The sensor measurements can be linked via kinematic equations and the mechanics of the flight. These interdependency relationships between the measurements and the parameters relating to the flight have the advantage of being able to increase the dissimilarity of the information via the use of virtual sensors. These virtual sensors deliver estimations of parameters and of measurements computed from combinations of sensors measuring quantities of different types. This approach has the advantage of not increasing the number of sensors necessary for the monitoring since it uses only the information already present on board the aircraft. Nevertheless, it may require the availability of sufficient embedded computation means. Analytical redundancy is used in the development of estimators. These estimators also have the advantage of being able to deliver an estimation of the quantity invalidated after failure in order to guarantee a greater availability of the flight parameters.

The problems which arise these days concern the two types of approaches. First of all, the use of the majority-based vote does not allow complete monitoring of the common failure modes. Then, the analytical redundancy is based on assumptions of validity of certain quantities, or of other sensors. It is necessary for these assumptions to be verified and for the algorithm developed to be validated.

One of the problems that is thus sought to be resolved is that of the dissociation of a failure on the incidence, of a failure on the speed and of an error on the weight in addition to the estimation issues. Many estimators have been developed to date, but none makes it possible to broach the problem with assumptions that allow this distinction to be made.

BRIEF SUMMARY OF THE INVENTION

Aspects of the present invention may mitigate this drawback by proposing a method and a device for monitoring and estimating parameters relating to a flight of an aircraft.

The parameters relating to a flight comprise at least one of the following elements: flight parameters, atmospheric parameters, sensor biases or modelling biases.

To this end, the invention relates to a method for monitoring and estimating:
parameters relating to the flight of an aircraft;
statuses of sensors, these statuses being representative of an operation of said sensors; and
a status of a parameter corresponding to the current weight of the aircraft, this status being representative of the validity of said parameter.

According to an aspect of the invention, the method comprises the following steps:
an initialization step, implemented by an initialization module, consisting in initializing the statuses of sensors configured to determine flight parameters of the aircraft and the status of the parameter corresponding to the current weight of the aircraft and in initializing parameters used in the implementation of the monitoring and estimation device;
the method further comprising the following steps, implemented iteratively:
an estimation step, implemented by an estimation module, consisting in determining an estimation of the values of the parameters relating to the flight of the aircraft and an estimation of an error of the current weight parameter, from:
measurements of the parameters relating to the flight supplied by the sensors,
parameters relating to the flight initialized in the initialization step or estimated on the preceding iteration of the estimation step and
statuses associated with each of said sensors,
the estimation step consisting also in generating residues which are functions of the measured and estimated values of the parameters relating to the flight and of innovation terms which correspond to the difference between a measured flight parameter value and said estimated value;
a first transmission step, implemented by a first transmission module, consisting:
in transmitting to a user device and to a detection module a signal representative of the estimation of the values of the parameters relating to the flight of the aircraft and of the estimation of the error of the current weight parameter, determined in the estimation step,
in sending to said detection module a signal representative of the residues generated in the estimation step;
a detection step, implemented by a detection module, consisting in determining the different statuses associated with each of said sensors and with the parameter corresponding to the current weight of the aircraft, from:
  the estimation of the values of the residues determined in the estimation step,
  the estimation of the values of the parameters relating to the flight of the aircraft determined in the estimation step,
  the measurements of the parameters relating to the flight supplied by the sensors,
  the estimation of the error of the current weight parameter determined in the estimation step, and
  the statuses determined on the preceding iteration of the detection step or initialized in the initialization step,
a second transmission step, implemented by a second transmission module, consisting in transmitting to the user device and, on the next iteration, to the estimation module the different statuses associated with each of said sensors and the status associated with said parameter corresponding to the current weight.

By virtue of an aspect of the invention, it is possible to identify the failures of sensors and a weight error in an embedded system of an aircraft. It also makes it possible to continuously supply an estimation of the parameters relating to the flight of the aircraft in real time and a status of the different sensors and of the parameter corresponding to the weight.

Furthermore, the estimation step comprises the following substeps:
  an adaptation substep, implemented by an adaptation submodule, consisting in determining a variance and/or a validity Boolean associated with each of the measurements of the parameters relating to the flight supplied by the sensors and of the setting parameters associated with the estimation algorithm used in an estimation substep, from:
    said measurements of the parameters relating to the flight, and
    the statuses associated with each of said sensors;
  the adaptation substep consisting also in correcting the current weight from a weight error estimated on the preceding iteration or initialized in the initialization step, and from a status associated with the parameter corresponding to the weight,
  the estimation substep, implemented by an estimation submodule, consisting in determining the estimation of the values of the parameters relating to the flight and an estimation of the error of said weight, from:
    the measurements of the parameters relating to the flight supplied by said sensors,
    the parameters relating to the flight estimated on the preceding iteration or initialized in the initialization step and
    from the variance and/or the validity Boolean of each of the measurements of the parameters relating to the flight and of the setting parameters determined in the adaptation substep,
  the estimation substep consisting also in generating the residues from the estimated and measured parameters relating to the flight and from the innovation terms.

Furthermore, the detection step comprises the following substeps:
  a substep of detection of a failing sensor and of incorrect parameters relating to the flight, implemented by a detection submodule, consisting in determining:
    the common status associated with the sensor configured to measure the angle of incidence of the aircraft and with the parameter corresponding to the current weight and
    the status associated with the other sensors, from:
      the measurements of the parameters relating to the flight supplied by said sensors,
      the estimation of the values of the parameters relating to the flight and the weight error,
      the statuses associated with each of said sensors and with the parameter corresponding to a current weight of the aircraft determined on the preceding iteration or initialized in the initialization step and
      the residues;
  a substep of validation of the angle of incidence and of the current weight, implemented by a validation submodule, consisting in determining the status associated with the parameter corresponding to the current weight and the status associated with the sensor configured to measure the angle of incidence (a), from:
    the common status associated with the sensor configured to measure the angle of incidence of the aircraft and with the parameter corresponding to the current weight,
    the statuses associated with the other sensors,
    the estimated parameters relating to the flight,
    the estimated weight error,
    the measured parameters relating to the flight,
    the residues generated in the estimation substep and
    a lift coefficient supplied from an embedded modelling fed by the parameters relating to the flight estimated and measured by the sensors.

Thus, it is possible to distinguish a fault between the measurement of angle of incidence and the parameter corresponding to the weight, including in the case of common failure modes.

According to a first embodiment, the estimation substep corresponds to an extended Kalman filter associated with a state vector, an observation vector and an auxiliary measurement vector,
the auxiliary measurement vector having for expression:

$$Z = \left( i_{H_m}, \delta_{q_{i_m}}, \delta_{sp_{i_m}}, \psi_m, \varphi_m, \theta_m, n_{X_{1_m}}, m, conf, V_{gx_{0_m}}, V_{gy_{0_m}}, V_{gz_{0_m}}, z_{g_m} \right),$$

in which:
  $i_{H_m}$ corresponds to a measurement of deflection of the horizontal plane, $\delta_{q_{i_m}}$ corresponds to a measurement of deflection of elevators of the aircraft, $\delta_{sp_{i_m}}$ corresponds to a measurement of deflection of spoilers of the aircraft, $\psi_m$ corresponds to a heading measurement, $\varphi_m$ corresponds to a list angle measurement, $\theta_m$ corresponds to an inclination measurement, $n_{x_{1_m}}$ corresponds to a measurement of longitudinal load factor in the reference frame associated with the aircraft, m corresponds to the current weight parameter of the aircraft, conf corresponds to a measurement of aerodynamic configuration of the aircraft, $V_{g_{x_{0_m}}}, V_{g_{y_{0_m}}}, V_{g_{z_{0_m}}}$ correspond to measurements of the ground speed components in the Earth's reference frame, and $z_{g_m}$ corresponds to a geometrical altitude measurement;

the state vector having for expression:

$$X = \begin{pmatrix} W_{x_0} \\ W_{y_0} \\ W_{z_0} \\ \Delta ISA \\ b_{C_L} \\ C_{b_x} \end{pmatrix},$$

in which:

($W_{x_0}$, $W_{y_0}$, $W_{x_0}$) correspond to the three components of the speed of the wind in the Earth's reference frame, $\Delta ISA$ corresponds to a temperature deviation between a current static temperature and a temperature determined from a standard atmosphere model at a current geometrical altitude, $b_{C_L}$ corresponds to a lift coefficient modelling bias, and $C_{b_x}$ corresponds to a barometric correction term;

the derivative of the state vector having for expression:

$$\dot{x} = \begin{pmatrix} \dot{W}_{x_0} = 0 \\ \dot{W}_{y_0} = 0 \\ \dot{W}_{z_0} = 0 \\ \Delta \dot{ISA} = 0 \\ \dot{b}_{C_L} = -\dfrac{b_{C_L}}{\tau_b} \\ \dot{C}_{b_x} = 0 \end{pmatrix},$$

in which $\tau_b$ corresponds to a characteristic time associated with a dynamic range of the lift coefficient modelling bias $b_{C_L}$, the observation vector having for expression:

$$Y = \begin{pmatrix} \alpha_m = \mathrm{atan}\left(\dfrac{w}{u}\right) \\ \beta_m = \mathrm{atan}\left(\dfrac{v}{\sqrt{u^2+w^2}}\right) \\ P_{S_m} = \zeta(z_P) \\ n_{Z_{1_m}} = \dfrac{\gamma S P_S M^2 (C_L + b_{C_L})}{2\,mg\cos\alpha} + n_{x_{1_m}}\tan\alpha \\ P_{T_m} = P_S\left(1+\dfrac{\gamma-1}{2}M^2\right)^{\frac{\gamma}{\gamma-1}} \\ T_{T_m} = T_S\left(1+\dfrac{\gamma-1}{2}M^2\right) \end{pmatrix},$$

in which:

$\alpha_m$ corresponds to an incidence measurement, $\beta_m$ corresponds to a slide slip measurement, $P_{S_m}$ corresponds to a static pressure measurement, $n_{Z_{1_m}}$ corresponds to a measurement of vertical load factor in a reference frame associated with the aircraft, $P_{T_m}$ corresponds to a total pressure measurement, $T_{T_m}$ corresponds to a total temperature measurement, and $z_P$ corresponds to the pressure altitude and is expressed according to the equation $$z_p = \dfrac{z_g}{1+\dfrac{\Delta ISA}{T_{15}}} - C_{b_x},$$

with $T_{15} = 288.15$ K, $\zeta$ corresponds to a function linking the measurement of the pressure altitude $z_P$ to the static pressure with the following expression:

$$\begin{cases} \zeta(z_{P_m} \geq z_{P_{11}}) = 10^{\log_{10}(P_{11}) + \frac{g(z_{P_{11}} - z_{P_m})}{RT_{11}\log(10)}} \\ \zeta(z_{P_m} < z_{P_{11}}) = P_0\left(1 - \dfrac{G_{T_{z_0}}}{T_{15}} z_{P_m}\right)^{\frac{g}{rG_{T_{z_0}}}} \end{cases},$$

in which:

$z_{P_{11}} = 11$ km corresponds to the standard altitude of the tropopause, $P_{11} = 226.321$ mbar and $T_{11} = 216.65$ K correspond to the standard static pressure and static temperature at the tropopause, $G_{T_{z_0}} = 0.0065$ K/m corresponds to the standard temperature gradient for $z_{P_m} < z_{P_{11}}$, G corresponds to the acceleration of gravity, R corresponds to the specific constant of the air, $T_S$ corresponds to the statistical temperature parameter and is expressed according to the equation $T_S = T_0 + G_{T_{z_0}} z_g + \Delta ISA$, with $T_0 = 273.15$ K and $G_{T_{z_0}} = 0.0065$ K/m, V corresponds to the air speed flight parameter and is expressed according to the equation $V = \sqrt{u^2 + v^2 + w^2}$, with each component of the air speed defined in the aircraft reference frame (u, v, w) expressed according to the following expression:

$$\begin{bmatrix} u \\ v \\ w \end{bmatrix} = \begin{bmatrix} \cos\theta\cos\psi & \cos\theta\sin\psi & \sin\theta \\ \sin\varphi\sin\theta\cos\psi - \cos\varphi\sin\psi & \sin\varphi\sin\theta\sin\psi + \cos\varphi\cos\psi & -\sin\varphi\cos\theta \\ \cos\varphi\sin\theta\cos\psi + \sin\varphi\sin\psi & \cos\varphi\sin\theta\sin\psi + \sin\varphi\sin\psi & -\cos\varphi\cos\theta \end{bmatrix} \begin{bmatrix} V_{g_{x_0}} - W_{x_0} \\ V_{g_{y_0}} - W_{y_0} \\ V_{g_{z_0}} - W_{z_0} \end{bmatrix}$$

M corresponds to the Mach number flight parameter computed as a function of the norm of the air speed V according to the equation $$M = \frac{V}{\sqrt{\gamma r T_s}}$$

with r corresponding to the specific constant of the air, the estimation substep generating, on an iteration k, the following residues:

a first residue having for expression at a time $t_k$ $$r_1(t_k) = \varepsilon_\alpha(t_k) + \frac{\hat{b}_{c_z}(t_k)}{C_{z_\alpha}(conf(t_k))}$$

in which:

$\varepsilon_\alpha(t_k)$ corresponds to the innovation term associated with the measurement of the angle of incidence α at the time $t_k$, $\hat{b}_{C_z}$ corresponds to an estimation of the modelling bias of the lift coefficient $C_z$ at the time $t_k$, and $C_{z_\alpha}(conf(t_k))$ corresponds to a tabulated value of the lift coefficient depending on a value of a configuration parameter of the aircraft at the time $t_k$, a second residue having for expression at the time $t_k$ $$r_2(t_k) = \sqrt{\frac{2}{\gamma-1}\left(\frac{T_{T_m}}{\hat{T}_s(z_{P_m}, t_k)} - 1\right)} - \sqrt{\frac{2}{\gamma-1}\left(\left(\frac{P_{T_m}}{\zeta(z_{P_m})}\right)^{\frac{\gamma-1}{\gamma}} - 1\right)}$$

in which:

γ corresponds to the adiabatic coefficient of the air, $T_{T_m}$ corresponds to a total temperature measured by one of the sensors used as input for the estimation module, $P_{T_m}$ corresponds to a total pressure measured by one of the sensors used as input for the estimation module, $z_{P_m}$ corresponds to a pressure altitude measured by one of the sensors used as input for the estimation module, ζ corresponds to the function linking the measurement of the pressure altitude to the static pressure and $\hat{T}_s(z_{P_m}, t_k)$ corresponds to an estimation of the static temperature computed from parameters relating to the flight estimated at the time $t_k$ on the current iteration and at a time $t_{k-1}$ on a preceding iteration as a function of the first residue according to the formula:

$$\hat{T}_s(z_{P_m}, t_k) = T_{15} +$$
$$G_{T_{z_0}}(z_{P_m}(t_k)) + \mathcal{L}(s)\left[\hat{C}_{b_x}(t_k)\Pi_{r_1^\pm}(r_1(t_k)) + \hat{C}_{b_x}(t_{k-1})(1 - \Pi_{r_1^\pm}(r_1(t_k)))\right] +$$

-continued
$$\mathcal{L}(s)\left[\overline{\Delta ISA}(t_k)\Pi_{r_1^\pm}(r_1(t_k)) + \overline{\Delta ISA}(t_{k-1})(1 - \Pi_{r_1^\pm}(r_1(t_k)))\right],$$

in which $\mathcal{L}$ is the transfer function of a low-pass filter and $$\Pi_{r_1^\pm}(r) = H\left(r + \frac{r_1^\pm}{2}\right) - H\left(r - \frac{r_1^\pm}{2}\right)$$

where H is the Heaviside function, and $r_1^\pm$ corresponds to the limits associated with the residue $r_1$ defined hereinafter in the description;

a third residue having for expression at the time $t_k$ $$r_3(t_k) = \sqrt{\frac{2}{\gamma-1}\left(\frac{T_{T_m}}{\hat{T}_s(z_{P_m}, t_k)} - 1\right)} -$$

$$\sqrt{\frac{2}{\gamma-1}\left(\frac{2\,mg\,n_{Z_{1_m}}\cos\alpha_m}{\gamma S \zeta(z_{P_m})\hat{C}_Z} - n_{X_{1_m}}\tan\alpha_m\right)}$$

in which:

m corresponds to the weight of the aircraft,

S corresponds to the reference surface of the aircraft, g corresponds to the acceleration of gravity, $n_{Z_{1_m}}$ corresponds to a vertical load factor, $n_{X_{1_m}}$ corresponds to a longitudinal load factor, $\widehat{C_Z}$ corresponds to the estimated lift coefficient, obtained from the estimated and measured parameters relating to the flight and from the configuration of the aircraft.

According to a first variant, the observation vector has for expression:

$$Y = \begin{pmatrix} \alpha_m = \text{atan}\left(\frac{w}{u}\right) \\ \beta_m = \text{atan}\left(\frac{v}{\sqrt{u^2+w^2}}\right) \\ P_{S_m} = \zeta(z_p) \\ n_{Z_m} = \frac{SP_d(C_L + b_{C_L})}{mg \cos \alpha} + n_{X_{1m}} \tan \alpha \\ P_{T_m} = P_S\left(1 + \frac{\gamma-1}{2}M^2\right)^{\frac{\gamma}{\gamma-1}} \\ T_{T_m} = T_S\left(1 + \frac{\gamma-1}{2}M^2\right) \\ P_{T_{eng}} = P_S\left(1 + \frac{\gamma-1}{2}M^2\right)^{\frac{\gamma}{\gamma-1}} \\ P_{S_{eng}} = \zeta(z_p) \\ T_{T_{eng_m}} = T_S\left(1 + \frac{\gamma-1}{2}M^2\right) \end{pmatrix}$$

in which:

$P_{T_{eng}}$ corresponds to a total pressure value derived from an engine-nacelle modelling, $P_{S_{eng}}$ corresponds to a static pressure value derived from the engine-nacelle modelling, and $T_{T_{eng_m}}$ corresponds to a measured total temperature value derived from an engine-nacelle total temperature sensor;
the estimation substep also generating the following residues:
a fourth residue having for expression $$r_4(t_k) = \varepsilon_{P_{T_{eng}}}(t_k)$$

in which $$\varepsilon_{T_{P_{eng}}}(t_k)$$

corresponds to the difference between the measured total pressure value and said total pressure value derived from the modelling at a time ($t_k$),
a fifth residue having for expression $$r_5(t_k) = \varepsilon_{P_{S_{eng}}}(t_k)$$

in which $$\varepsilon_{P_{S_{eng}}}(t_k)$$

corresponds to the difference between the measured static pressure value and said static pressure value derived from the modelling at a time ($t_k$), and
a sixth residue having for expression $r_6(t_k) = \varepsilon_{TAT_{eng}}(t_k)$ in which $\varepsilon_{TAT_{eng}}(t_k)$ corresponds to the difference between the measured total temperature value and said total temperature value derived from the engine-nacelle measurement at a time ($t_k$).

The engine-nacelle modelling is described in the patent FR 2 977 942. It makes it possible to deduce therefrom the two virtual measurements $P_{S_{eng}}$ and $$P_{T_{eng}}$$

that are useful to the present patent. In summary, the static pressure $P_{S_{eng}}$ obtained is made up of digital data corresponding to the measurements of static pressures of the ambient air in the nacelle $P_{nac}$ whereas the total pressure $P_{T_{eng}}$ obtained is deduced from the input of data corresponding to the measurements of static pressures of the ambient air in the nacelle $P_{nac}$, of "engine" static pressure $P_{mot}$, of the speed of rotation of the fan of the engine and from the measurement of total temperature of the air.

According to a second variant, the estimation substep corresponds to an extended Kalman filter associated with a state vector and an observation vector and an auxiliary measurement vector,
the auxiliary measurement vector having for expression:

$$Z = \left(i_{H_m}, \delta_{q_{i_m}}, \delta_{sp_{i_m}}, \psi_m, \varphi_m, \theta_m, n_{X_{1m}}, n_{Y_{1m}}, m, conf, V_{g x_{0_m}}, V_{g y_{0_m}}, V_{g z_{0_m}}, z_{g_m},\right),$$

in which $$n_{Y_{1m}}$$

corresponds to a measurement of a lateral load factor in the reference frame associated with the aircraft,
the state vector having for expression:

$$X = \begin{pmatrix} W_{x_0} \\ W_{y_0} \\ W_{z_0} \\ \Delta ISA \\ b_{C_L} \\ C_{b_x} \\ V_{g x_0} \\ V_{g y_0} \\ V_{g z_0} \\ b_{n_{x_1}} \\ b_{n_{y_1}} \\ b_{n_{z_1}} \\ z_G \end{pmatrix},$$

in which:

$$V_{g x_0}, V_{g y_0}, V_{g z_0}$$

correspond to the three components of the ground speed in the Earth's reference frame, $$b_{n_{x_1}}, b_{n_{y_1}}, b_{n_{z_1}}$$

correspond to the three bias components of accelerometers in the reference frame associated with the aircraft, $z_G$ corresponds to a geometrical altitude;

the derivative of the state vector having for expression:

$$\dot{X} = \begin{pmatrix} \dot{W}_{x_0} = 0 \\ \dot{W}_{y_0} = 0 \\ \dot{W}_{z_0} = 0 \\ \Delta I\dot{S}A = 0 \\ \dot{b}_{C_L} = -\frac{b_{C_L}}{\tau_b} \\ \dot{C}_{b_x} = 0 \\ \dot{v}_{g_{x_0}} \\ \dot{v}_{g_{y_0}} = -g * M_{rot} \begin{pmatrix} (n_{x_{1_m}} + b_{nx}) \sin \theta \\ (n_{y_{1_m}} + b_{ny}) \cos \theta \sin \phi \\ (n_{z_{1_m}} + b_{nz}) \cos \theta \cos \phi \end{pmatrix} \\ \dot{v}_{g_{z_0}} \\ \dot{b}_{n_{x_1}} = 0 \\ \dot{b}_{n_{y_1}} = 0 \\ \dot{b}_{n_{z_1}} = 0 \\ \dot{z}_G = V_{g_{z_0}} \end{pmatrix},$$

in which:

$M_{rot}$ corresponds to a standard matrix of rotation of the Earth's reference frame to the reference frame associated with the aircraft and has for expression $$M_{rot} = \begin{pmatrix} \cos\theta\cos\psi & \sin\phi\sin\theta\cos\psi - \cos\phi\sin\psi & \cos\phi\sin\theta\cos\psi + \sin\phi\sin\psi \\ \cos\theta\sin\psi & \sin\phi\sin\theta\sin\psi + \cos\phi\cos\psi & \cos\phi\sin\theta\sin\psi - \sin\phi\cos\psi \\ \sin\theta & -\sin\phi\cos\theta & -\cos\phi\cos\theta \end{pmatrix},$$

the observation vector having for expression:

$$Y = \begin{pmatrix} \alpha_m = \operatorname{atan}\left(\frac{w}{u}\right) \\ \beta_m = \operatorname{atan}\left(\frac{v}{\sqrt{u^2 + w^2}}\right) \\ P_{S_m} = \zeta(z_p) \\ n_{Z_m} = \frac{SP_d(C_L + b_{C_L})}{mg \cos \alpha} + n_{x_{1_m}} \tan \alpha \\ P_{T_m} = P_S\left(1 + \frac{\gamma-1}{2}M^2\right)^{\frac{\gamma}{\gamma-1}} \\ T_{T_m} = T_S\left(1 + \frac{\gamma-1}{2}M^2\right) \\ M_{eng} = \frac{V}{\sqrt{\gamma r T_S}} \\ P_{S_{eng}} = \zeta(z_p) \\ T_{T_{eng_m}} = T_S\left(1 + \frac{\gamma-1}{2}M^2\right) \\ V_{g_{x_{0_m}}} = V_{g_{x_0}} \\ V_{g_{y_{0_m}}} = V_{g_{y_0}} \\ V_{g_{z_{0_m}}} = V_{g_{z_0}} \\ z_{G_m} = z_G \end{pmatrix},$$

in which:

$V_{g_{x_{0_m}}}, V_{g_{y_{0_m}}}, V_{g_{z_{0_m}}}$ correspond to measurements of three components of the ground speed, and $z_{G_m}$ corresponds to a measurement of the geometrical altitude.

According to a third variant, the lateral component v of the air speed V is assumed nil.

That means that the side slip p is assumed nil.

Moreover, the determination of the common status and of the status associated with the other sensors of the failing sensor detection substep comprises the following substeps:

a substep of assignment to each residue of a maximum limit and a minimum limit from the estimated flight parameters;

the substep being also a substep of construction of a first validity indicator associated with the static pressure sensor and of a second validity indicator associated with the total pressure sensor from the estimated parameters and the measurements derived from the sensors of the aircraft:

the first validity indicator having the value 1 if the relationship $|\mathcal{L}_h(s)(z_{P_m} - z_{G_m})| \leq 1_{P_S}$ is borne out, the first validity indicator having the value 0 if the relationship $|\mathcal{L}_h(s)(z_{P_m} - z_{G_m})| \leq 1_{P_S}$ is not borne out, in which $1_{P_S}$ corresponds to a limit determined experimentally as a function of the dynamics of the aircraft, $\mathcal{L}_h$ corresponding to the transfer function of a high-pass filter, the second validity indicator having the value 0 by default and 1 if the residue $r_1$ crosses its respective limits, at an instant $t_k$, determined later and that $\exists n \in \mathbb{N}$ such that $t_n \in [t_k - \tau_{P_T}, t_k]$ bearing out $|(1 - \mathcal{L}_\tau)(M_{P_T}(t_n) - M_{P_T}(t_{n-j}))| \leq 1_{P_T}$, with $\tau_{P_T}$ a time constant, $\mathcal{L}_\tau$ a transfer function of a low-pass filter having $\tau$ for time constant, $j \in \mathbb{N}$ a constant, and $1_{P_T}$ a limit determined experimentally as a function of the dynamics of the aeroplane;

residue indicators being computed and associated with each residue and validity indicators;

a substep of identification of the occurrence of failures when the sum of the residue indicators is strictly greater than zero and identification, in case of failure, of the faulty sensor by comparing the current values of the residue indicators to those itemized in a table, identified offline or online, itemizing the failure cases as a function of the different combinations of values of the residue indicators.

According to a second embodiment, the statuses associated with each of said sensors are also determined from auxiliary statuses associated with each of said sensors that can be sent to the detection module by a monitoring module.

According to a third embodiment, for a measured consolidated flight parameter from a plurality of sensors, the method comprises the following substeps implemented by a unitary verification module, when a failure is detected for a sensor measuring said flight parameter for which said measurement is used as input for the estimation module:

a substep of reconfiguration of the estimation submodule to not take account of the incorrect measurement of the flight parameter used hitherto in the estimation substep,
a substep of computation of the difference between the estimation of said flight parameter and of the measurement of one of said sensors derived from the plurality of sensors, for each of the measurements derived from the plurality of sensors,
if the absolute value of the difference is less than a predetermined value, the measurement being retained in the estimation substep.

The invention relates also to a device for monitoring and estimating:
parameters relating to the flight of an aircraft;
statuses of sensors, these statuses being representative of an operation of said sensors; and
a status of a parameter corresponding to the current weight of the aircraft, this status being representative of the validity of said parameter.

According to an embodiment of the invention, the monitoring and estimation device comprises:
an initialization module, configured to initialize the statuses of sensors configured to determine parameters relating to the flight of the aircraft and the status of the parameter corresponding to the current weight of the aircraft and to initialize the parameters used in the implementation of the monitoring and estimation device; the monitoring and estimation device further comprises the following modules, implemented iteratively:
an estimation module, configured to determine an estimation of the values of the parameters relating to the flight of the aircraft and an estimation of an error of the current weight parameter, from:
measurements of the parameters relating to the flight supplied by the sensors,
parameters relating to the flight initialized in the initialization step or estimated on the preceding iteration of the estimation step and
statuses associated with each of said sensors,
the estimation module being also configured to generate residues which are functions of the measured and estimated values of the parameters relating to the flight and of innovation terms which correspond to the difference between a measured flight parameter value and said estimated value;
a first transmission module configured to:
transmit to a user device and to a detection module a signal representative of the estimation of the values of the parameters relating to the flight of the aircraft and of the estimation of the error of the current weight parameter, determined in the estimation step,
send a signal representative of the residues generated in the estimation step to said detection module;
a detection module configured to determine the different statuses associated with each of said sensors and with the parameter corresponding to the current weight of the aircraft, from:
the estimation of the values of the residues determined in the estimation step,
the estimation of the values of the parameters relating to the flight of the aircraft determined in the estimation step,
the measurements of the parameters relating to the flight supplied by the sensors,
the estimation of the error of the current weight parameter determined by the estimation module,
said statuses determined on the preceding iteration or initialized in the initialization step,
a second transmission module configured to transmit to the user device and, on the next iteration, to the estimation module the different statuses associated with each of said sensors and the status associated with said parameter corresponding to the current weight.

Furthermore, the estimation module comprises:
an adaptation submodule configured to determine a variance and/or a validity Boolean associated with each of the measurements of the parameters relating to the flight supplied by the sensors and of the setting parameters associated with the estimation algorithm used in an estimation submodule, from:
said measurements of the parameters relating to the flight and
from the statuses associated with each of said sensors;
the adaptation submodule being also configured to correct the current weight from an estimation of a weight error obtained on the preceding iteration or initialized by the initialization module, and from a status associated with the parameter corresponding to the weight,
the estimation submodule configured to determine the estimation of the values of the parameters relating to the flight and an estimation of the error of said weight, from:
the measurements of the parameters relating to the flight supplied by said sensors,
the parameters relating to the flight estimated on the preceding iteration or initialized in the initialization step and
from the variance and/or the validity Boolean of each of the measurements of the parameters relating to the flight and of the setting parameters determined in the adaptation substep,
the estimation submodule being also configured to generate residues from the estimated and measured parameters relating to the flight and from the innovation terms.

Furthermore, the detection module comprises:
a detection submodule configured to determine:
the common status associated with the sensor configured to measure the angle of incidence of the aircraft and with the parameter corresponding to the current weight and
the status associated with the other sensors,
from:
the measurements of the parameters relating to the flight supplied by said sensors,
the estimation of the values of the parameters relating to the flight and the weight error,
the statuses associated with each of said sensors and with a parameter corresponding to a current weight of the aircraft determined on the preceding iteration or initialized in the initialization step, and
the residues;
a validation submodule configured to determine the status associated with the parameter corresponding to the current weight and the status associated with the sensor configured to measure the angle, from:
the common status associated with the sensor configured to measure the angle of incidence of the aircraft and with the parameter corresponding to the current weight,
the statuses associated with the other sensors,
the estimated parameters relating to the flight,
the estimated weight error,
the measured parameters relating to the flight, the residues generated in the estimation substep and
a lift coefficient supplied from an embedded modelling fed by the parameters relating to the flight estimated and measured by said sensors.

The invention also relates to an aircraft, in particular a transport aeroplane, which comprises a device for monitoring and estimating flight parameters of an aircraft such as described above.

BRIEF DESCRIPTION OF THE DRAWINGS

The invention, with its features and advantages, will emerge more clearly on reading the description given with reference to the attached drawings in which.

DETAILED DESCRIPTION

The description below will refer to the figures cited above.

Figure 1:
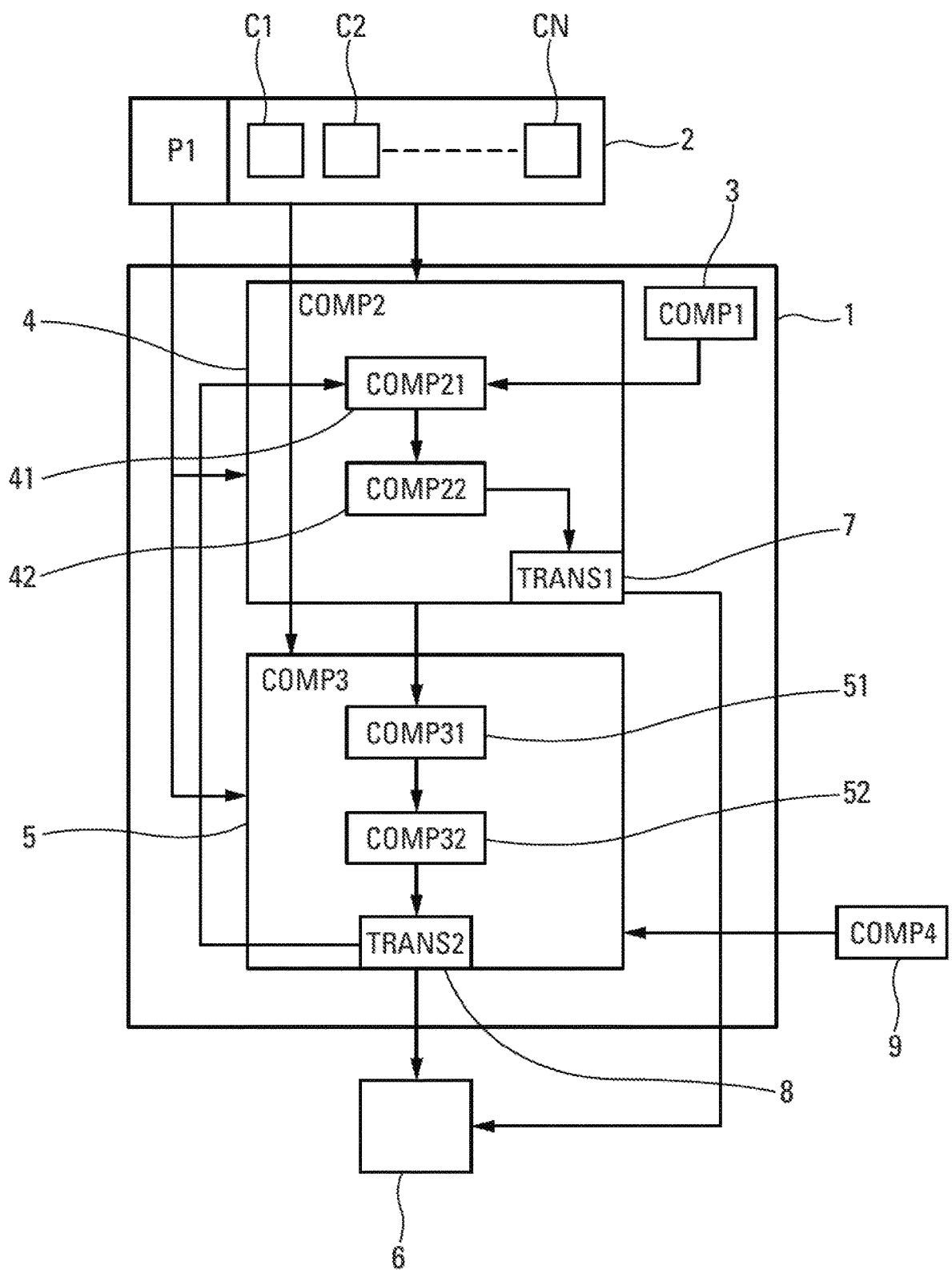
FIG. 1 represents a block diagram of an embodiment of the monitoring and estimation device.
Figure 5:
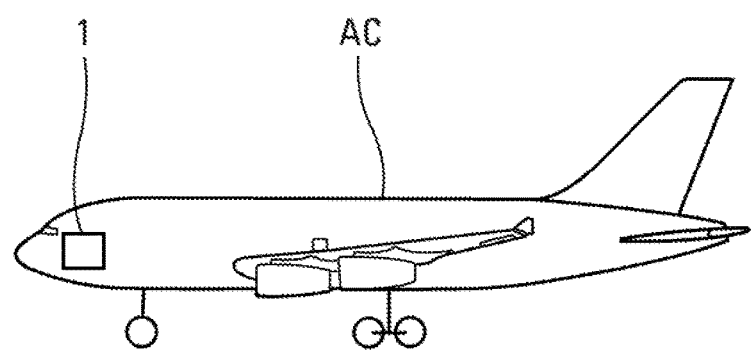
FIG. 5 represents an aircraft with the monitoring and estimation device embedded.

FIG. 1 illustrates an embodiment of the device 1 for monitoring and estimating parameters relating to the flight of an aircraft AC and statuses associated with the operation of the sensors C1, C2, . . . , CN and with the validity of a parameter P1 corresponding to the weight of said aircraft, that can be embedded on an aircraft AC (FIG. 5). Said device is called "monitoring and estimation device" hereinafter in the description. The monitoring and estimation device is configured to implement a monitoring and estimation method.

The parameters relating to the flight correspond to at least one of the following parameters: flight parameters, atmospheric parameters, sensor bias parameters, modelling bias parameters.

The flight parameters correspond to the flight parameters measured directly by sensors and/or to the flight parameters recomputed from measured flight parameters and/or estimated parameters relating to the flight.

The measured flight parameters comprise, for example, the angle of incidence α of the aircraft AC, the static pressure $P_S$, the total pressure $P_T$, the load factor $n_{Z_1}$, etc. They are directly derived from sensor measurements.

The recomputed flight parameters comprise, for example, the weight of the aircraft AC, the Mach number, the air speed, the calibrated speed, etc.

The estimated parameters relating to the flight refer to any parameter relating to the flight derived from an estimation result.

The atmospheric parameters correspond to the parameters associated with the atmospheric environment. The atmospheric parameters comprise, for example, the wind speed, the local pressure or temperature gradients, the temperature deviations ΔISA between a recomputed static temperature and a temperature modelled by the international standard atmosphere model.

The sensor bias parameters correspond to parameters that make it possible to know the bias of a measurement derived from a sensor.

The modelling bias parameters correspond to deviations due to digital models that can comprise sequences of more or less approximated equations or interpolation tables.

The monitoring and estimation device 1 comprises an initialization module COMP1 3 configured to initialize the statuses of sensors C1, C2, . . . CN of the parameter P1 corresponding to the weight of the aircraft AC and of the parameters used in the implementation of the monitoring and estimation device 1. For example, the initialization can correspond at least to the fact that the statuses of all the sensors C1, C2, . . . CN are considered to be statuses representative of the correct operation of said sensors C1, C2, . . . CN. The parameters used in the implementation of the device 1 can comprise the parameters relating to the flight or intermediate parameters relating to the operation of the embedded algorithms during the implementation of the device 1.

The monitoring and estimation device 1 further comprises at least the following modules which are implemented iteratively:
  an estimation module COMP2 4 (COMP for "computational module"); and
  a detection module COMP3 5.

The estimation module 4 is configured to determine an estimation of the values of the parameters relating to the flight of the aircraft AC from:
  measurements of the parameters relating to the flight supplied by the sensors C1, C2, . . . CN,
  parameters relating to the flight estimated on the preceding iteration or initialized by the initialization module 3 and
  statuses associated with each of said sensors C1, C2, . . . CN.

The estimation module 4 is also configured to generate residues which are functions of the measured and estimated values of the parameters relating to the flight and of innovation terms which correspond to the difference between a measured flight parameter value and said estimated value.

FIG. 1 represents a set 2 of N sensors C1, C2, . . . CN.

The detection module 5 is configured to determine the different statuses associated with each of said sensors C1, C2, . . . CN, with a parameter P1 corresponding to a current weight of the aircraft AC, and an estimation of an error of said current weight. The different statuses, the parameter P1 and the error estimation are determined from:
  said residues determined by the estimation module 4,
  estimated and measured parameters relating to the flight of the aircraft and the estimation of the weight error, determined by the estimation module 4,
  said statuses determined on the preceding iteration or initialized by the initialization module 3.

The monitoring and estimation device 1 also comprises a first transmission module TRANS1 7 (TRANS for "transmission module") configured to:
  transmit to a user device 6 and to the detection module 5 a signal representative of the estimation of the values of the parameters relating to the flight of the aircraft AC and of the weight error, determined by the estimation module 4, and
  send to the detection module 5 a signal representative of the residues generated by the estimation module 4.

The monitoring and estimation device 1 also comprises a second transmission module TRANS2 8 configured to transmit to the user device 6 and to the estimation module 4 the different statuses associated with each of said sensors C1, C2, . . . CN, with said parameter P1 corresponding to the weight. The transmission of the statuses to the estimation module 4 is performed on the next iteration.

This monitoring and estimation device 1 tackles resolving the problem of being capable of distinguishing a fault between the different sensors C1, C2, . . . CN and the parameter P1 corresponding to the current weight used as input for the monitoring and estimation device 1, and, more specifically, a fault between the incidence, the weight and the speed, including in the case of common failure modes. It makes it possible to continuously deliver an estimation of the parameters relating to the flight of the aircraft AC in real time, including its weight, as well as a status of the different anemometric and clinometric sensors.

The estimation module 4 can comprise the following submodules:
an adaptation submodule COMP21 41; and
an estimation submodule COMP22 42.

The adaptation submodule 41 is configured to determine a variance and/or a validity Boolean associated with each of the measurements of the parameters relating to the flight supplied by the sensors C1, C2, . . . CN and of the setting parameters associated with the estimation algorithm used in the estimation submodule 42. The determination is performed from said measurements of the parameters relating to the flight and from the statuses associated with each of said sensors C1, C2, . . . CN. The adaptation submodule 41 is also configured to correct the current weight as a function of the weight error estimated on the preceding iteration or initialized by the initialization module 3, and of the status associated with the parameter P1 corresponding to the weight.

The variances and/or the validity Booleans are determined for flight parameter measurements supplied by sensors C1, C2, . . . CN whose statuses are representative of an operation of the sensors C1, C2, . . . CN.

The adaptation submodule 41 allows the monitoring and estimation device 1 to be configured as a function of the failure cases detected, thus ensuring that said monitoring and estimation device 1 is never fed with a measurement from a sensor C1, C2, . . . CN exhibiting a failure.

The determined variance depends on the sensor C1, C2, . . . CN and reports its accuracy. In a case of failure of a sensor C1, C2, . . . CN, the variance of the measurement of the sensor C1, C2, . . . CN exhibiting a failure is significantly increased so that the latter no longer has an impact in the estimation module. With regard to the validity Booleans, their value is modified in case of failure and in case of revalidation. Only the use of estimation modules based on probability densities requires the association of variances with each of the measurements. In the other cases, the validity Booleans will be used in order to not update the monitoring and estimation method with incorrect measurements.

The adaptation submodule 41 also ensures the observability of the system. Consequently, in case of failure of a sensor C1, C2, . . . CN, it acts on the setting of the estimation module in order to freeze certain states to ensure the convergence of the estimation module. This procedure can be set offline by a user as a function of the failure cases that can be encountered.

Finally, the adaptation submodule 41 also makes it possible to correct the current weight as a function of an estimation of a weight error obtained on the preceding iteration or initialized by the initialization module 3 and of a status associated with the parameter corresponding to the weight.

The estimation submodule 42 is configured to determine the estimation of the values of the parameters relating to the flight and an estimation of the error of said weight, from:
the measurements of the parameters relating to the flight supplied by said sensors C1, C2, . . . CN,
the parameters relating to the flight estimated on the preceding iteration or initialized by the initialization module 3 and
the variance and/or the validity Boolean of each of the measurements of the parameters relating to the flight and of the setting parameters determined by the adaptation submodule 41.

The estimation submodule 42 is also configured to determine the innovations associated with each of the parameters relating to the flight. An innovation is equal to the difference between a measurement of a parameter relating to the flight and an estimation value of said parameter relating to the flight. Finally, it is configured to generate the residues from the innovation terms and the measured and estimated parameters relating to the flight.

The detection module 5 can comprise the following submodules:
a detection submodule COMP31 51; and
a validation submodule COMP32 52.

The detection submodule 51 is configured to determine:
the common status associated with the sensor C1 configured to measure the angle of incidence α of the aircraft AC and with the parameter P1 corresponding to the current weight and
the status associated with the other sensors C2, C3, . . . , CN.

These statuses are determined from:
the measurements of the parameters relating to the flight supplied by said sensors C1, C2, . . . , CN,
the estimation of the values of the parameters relating to the flight and the weight error,
the statuses associated with each of said sensors C1, C2, . . . , CN and with a parameter P1 corresponding to the current weight of the aircraft AC determined on the preceding iteration or initialized by the initialization module 3,
the residues.

The submodule for the validation of the angle of incidence and of the current weight 52 is configured to determine the status associated with the parameter P1 corresponding to the current weight and the status associated with the sensor C1 configured to measure the angle of incidence α.

The determination is performed from:
the common status associated with the sensors C1 configured to measure the angle of incidence of the aircraft AC and with the parameter P1 corresponding to the current weight,
the statuses associated with the other sensors (C2, C3, CN),
the estimated parameters relating to the flight,
the estimated weight error,
the measured parameters relating to the flight,
the residues generated by the estimation submodule 42, and
a lift coefficient $C_L$ supplied by an embedded modelling and fed by the parameters relating to the flight measured by the sensors C1, C2, . . . , CN and by the estimated parameters relating to the flight.

Hereinafter in the description, the index m refers to the measurements derived from the sensors of the aircraft used as input for the estimation submodule 42.

According to a first embodiment, the estimation submodule 42 corresponds to a Bayesian estimation module of extended Kalman filter type associated with the following system:

$$\begin{cases} \dot{X}(t) = \mathcal{F}(X(t)) \\ Y(t) = \mathcal{G}(X(t), Z(t), C_L(X(t), Z(t))) \end{cases},$$

in which X is the state vector, Y is the observation vector, Z is an auxiliary measurement vector, $\mathcal{F}$ is the function associated with the state equation and $\mathcal{G}$ is the function associated with the observation equation.

The auxiliary measurement vector Z has for expression:

$$Z = \left(i_{H_m}, \delta_{q_{i_m}}, \delta_{sp_{i_m}}, \psi, \varphi, \theta, n_{X_{1_m}},, m, conf, V_{g_{x_{0_m}}}, V_{g_{y_{0_m}}}, V_{g_{z_{0_m}}}, z_{g_m}\right),$$

in which:
$i_{H_m}$ corresponds to a measurement of deflection of the horizontal plane, $\delta_{q_{i_m}}$ corresponds to a measurement of deflection of elevators of the aircraft (AC), $\delta_{sp_{i_m}}$ corresponds to a measurement of deflection of spoilers of the aircraft (AC),
ψ corresponds to a heading measurement,
φ corresponds to a list angle measurement,
θ corresponds to an inclination measurement, $n_{X_{1_m}}$ corresponds to a measurement of the longitudinal load factor in the reference frame associated with the aircraft (AC),
m corresponds to the current weight parameter of the aircraft (AC),
conf corresponds to a measurement of configuration of the aircraft (AC), $V_{g_{x_{0_m}}}, V_{g_{y_{0_m}}}, V_{g_{z_{0_m}}}$ correspond to the measurements of the ground speed components in the Earth's reference frame, and
$z_{g_m}$ corresponds to a measurement of geometrical altitude.

The configuration measurement corresponds, for example, to the position of the leading edge and of the foil flaps of the aircraft AC.

The Kalman filter is associated with the state vector X and with the observation vector Y.

The Kalman filter does not consider the classic aircraft AC states but considers the atmospheric states as well as biases.

The state vector X has for expression:

$$X = \begin{pmatrix} W_{x_0} \\ W_{y_0} \\ W_{z_0} \\ \Delta ISA \\ b_{C_L} \\ C_{b_x} \end{pmatrix},$$

in which:
($W_{x_0}$, $W_{y_0}$, $W_{z_0}$) correspond to the three components of the speed of the wind in the Earth's reference frame,
ΔISA corresponds to a temperature deviation between a current static temperature and a temperature determined from a standard atmosphere model at a current geometrical altitude,
$b_{C_L}$ corresponds to a lift coefficient modelling bias, and
$C_{b_x}$ corresponds to a barometric correction term.

The derivative of the state vector X has for expression:

$$\dot{x} = \begin{pmatrix} \dot{W}_{x_0} = 0 \\ \dot{W}_{y_0} = 0 \\ \dot{W}_{z_0} = 0 \\ \Delta \dot{ISA} = 0 \\ \dot{b}_{C_L} = -\dfrac{b_{C_L}}{\tau_b} \\ \dot{C}_{b_x} = 0 \end{pmatrix},$$

in which $\tau_b$ corresponds to a characteristic time associated with the Markov process used to characterize the trend of the modelling bias. Without being limiting, this characteristic time is set at a few seconds, for example 30 seconds. A similar modelling can be used to describe the trend of the components of the wind.

The observation vector Y has for expression:

$$Y = \begin{pmatrix} \alpha_m \\ \beta_m \\ P_{S_m} \\ n_{Z_{1_m}} \\ P_{T_m} \\ T_{T_m} \end{pmatrix},$$

in which:
$\alpha_m$ corresponds to a measurement of angle of incidence,
$\beta_m$ corresponds to a side slip measurement,
$P_{S_m}$ corresponds to a static pressure measurement, $n_{Z_{1_m}}$ corresponds to a measurement of vertical load factor in a reference frame associated with the aircraft,
$P_{T_m}$ corresponds to a total pressure measurement, and
$T_{T_m}$ corresponds to a total temperature measurement.
The incidence has for expression:

$$\alpha_m = \operatorname{atan}\left(\frac{w}{u}\right),$$

in which u and w are, respectively, the longitudinal and vertical components of an air speed having for norm $V = \sqrt{u^2+v^2+w^2}$ where v is the lateral component.
The components of the air speed V have for expression:

$$\begin{bmatrix} u \\ v \\ w \end{bmatrix} = \begin{bmatrix} \cos\theta\cos\psi & \cos\theta\sin\psi & \sin\theta \\ \sin\varphi\sin\theta\cos\psi - \cos\varphi\sin\psi & \sin\varphi\sin\theta\sin\psi + \cos\varphi\cos\psi & -\sin\varphi\cos\theta \\ \cos\varphi\sin\theta\cos\psi + \sin\varphi\sin\psi & \cos\varphi\sin\theta\cos\psi + \sin\varphi\sin\psi & -\cos\varphi\cos\theta \end{bmatrix} \cdot \begin{bmatrix} V_{g_{x_0}} - W_{x_0} \\ V_{g_{y_0}} - W_{y_0} \\ V_{g_{z_0}} - W_{z_0} \end{bmatrix},$$

in which:

$V_{g_{x_0}}, V_{g_{y_0}}, V_{g_{z_0}}$ are the components of the ground speed in the Earth's reference frame,
$\psi$ corresponds to a heading measurement,
$\varphi$ corresponds to a list angle measurement, and
$\theta$ corresponds to an inclination measurement.
The side slip has for expression:

$$\beta_m = \operatorname{atan}\left(\frac{v}{\sqrt{u^2+m^2}}\right).$$

The static pressure has for expression:

$P_{S_m} = \zeta(z_{P_m})$, in which is a function linking the measurement of the pressure altitude $z_{P_m}$ to the static pressure $P_{S_m}$ according to the formula:

$$\begin{cases} \zeta(z_{P_m} \geq z_{P_{11}}) = 10^{\log_{10}(P_{11}) + \frac{g(z_{P_{11}} - z_{P_m})}{RT_{11}\log(10)}} \\ \zeta(z_{P_m} < z_{P_{11}}) = P_0\left(1 - \frac{G_{T_{z_0}}}{T_{15}}z_{P_m}\right)^{\frac{g}{rG_{T_{z_0}}}} \end{cases},$$

in which $z_{P_{11}}=11$ km corresponds to the standard altitude of the tropopause, $P_{11}=226.321$ mbar and $T_{11}=216.65$ k correspond to the standard static pressure and static temperature at the tropopause, $G_{T_{z_0}}=0.0065$ k/m corresponds to the standard temperature gradient for $z_{P_m} < z_{P_{11}}$, g corresponds to the acceleration of gravity and r corresponds to the specific constant of the air.

The pressure altitude has for expression:

$$z_{P_m} = \frac{z_G}{1 + \frac{\Delta ISA}{T_{15}}} - C_{b_x}$$

in which $T_{15}=288.15$ K.
The vertical load factor $n_{Z_{1_m}}$ has for expression:

$$n_{z_{1_m}} = \frac{\gamma S P_S M^2 (C_L + b_{C_L})}{2\,mg\cos\alpha} + n_{X_{1_m}} \tan\alpha,$$

in which $\gamma$ is the adiabatic incidence of the air (equal to 1.4), S is the reference surface of the aircraft, M is the Mach number, $C_L$ is the lift coefficient, $n_{X_{1_m}}$ is the horizontal load factor, m is the weight of the aircraft, g is the acceleration of gravity. The Mach number M has for expression $$M = \frac{V}{\sqrt{\gamma r T_S}},$$

in which $T_S$ is the static temperature and r is the specific constant of the air.
The static temperature $T_S$ has for expression $T_s = T_0 + G_{T_{z_0}} z_G + \Delta ISA$, in which $T_0=273.15$ K, $G_{T_{z_0}}=0.0065$ K/m and $z_G$ is the geographic altitude.
The total pressure has for expression:

$$P_T = P_S\left(1 + \frac{\gamma-1}{2}M^2\right)^{\frac{\gamma}{\gamma-1}}.$$

The total temperature has for expression:

$$T_T = T_S\left(1 + \frac{\gamma-1}{2}M^2\right).$$

The sensors considered are therefore three anemometric sensors (static pressure, total pressure and total temperature sensors), angle of incidence probes C1, positioning sensors such as satellite geolocation systems (GPS for "Global Positioning System") and inertial units such as IRS ("Inertial Reference System") systems. A first anemometric sensor measures the total pressure. A second anemometric sensor measures the static pressure. A third anemometric sensor measures the total temperature.

Among the parameters that can be incorrect, there is the parameter P1 corresponding to the weight of the aircraft AC. The parameter P1 is equal to the sum of the weight of the aircraft AC without fuel and of the weight of the fuel. This parameter P1 can be incorrect on take-off of the aircraft AC and until the end of the flight.

The setting of the extended Kalman filter is performed via state and measurement noise covariance matrixes and on the initialization implemented by the initialization module 3 on a state vector $X_0$ and a covariance matrix of the error $P_0$.

From an algorithmic point of view, an analytical formulation is preferentially used for the computation of the Jacobian matrixes associated with the Kalman filter.

Preferably, in a Kalman filter correction step, an algorithm of sequential processing of the measurements is used in order to be able to select, on a per-case basis, the valid measurements, without modifying the settings of the measurement noise covariance matrix R. This makes it possible in particular to avoid a more computation time-consuming matrix inversion operation. For the determination of the valid measurements, use will be made of the validity vector $f=[FI_{sensors}]$ obtained from the combinations of the different fault indicators defined in the detection submodule 51 whose value refers to the validity of the sensors C1, C2, . . . , CN used as input and of the parameter P1 corresponding to the weight. Said vector refers to the value of the variances and validity Booleans. The change of the value of a validity Boolean from 1 to 0 or a drastic increase in the associated variance makes it possible to no longer take account of the invalidated sensor in the updating of the states whereas the change of a validity Boolean from 0 to 1 or the reselection of a standard variance makes it possible to once again select the valid parameter and/or sensor. Adaptive extended Kalman filter is then referred to for all of the estimation module. The validity vector f is kept up to date using the detection module 5. All of the values of the parameters of the observation vector Y(t) and of the auxiliary measurement vector Z(t) define the inputs of the estimation submodule implementing the extended Kalman filter. The extended Kalman filter is formed to deliver in real time, in a flight of the aircraft AC, estimations of the selected flight parameters and of the atmospheric and bias parameters and makes it possible in particular to recompute an estimated calibrated speed CAS according to the formula:

$$CAS = \sqrt{\gamma R T_0} \sqrt{\frac{2}{\gamma-1}\left(\left(\frac{P_T - P_S}{P_0} + 1\right)^{\frac{\gamma-1}{\gamma}} - 1\right)}$$

With $P_0=101325$ Pa, $T_0=273.15$ K and $\gamma=1.4$, the adiabatic incidence of the air and $r=287.058$ J·kg$^{-1}$·K$^{-1}$, the specific constant of the air.

The estimation submodule 42 generates, on an iteration k, the following residues.

$$r_1(t_k) = \varepsilon_\alpha(t_k) + \frac{\hat{b}_{C_L}(t_k)}{C_{L_\alpha}(conf(t_k))}$$

A first residue $r_1$ has for expression in which $\varepsilon_\alpha(t_k)$ corresponds to the innovation term associated with the angle of incidence α at a time $t_k$, $\hat{b}_{C_L}$ corresponds to the estimated modelling bias of the lift coefficient, and $C_{L_\alpha}(conf(t_k))$ corresponds to a tabulated value of the lift coefficient $C_{L_\alpha}$ depending only on the value of the parameter corresponding to the configuration of the aircraft AC (position of the leading edge and of the foil flaps of the aircraft AC) at a time $t_k$.

A second residue $r_2$ has for expression at the time $$t_k r_2(t_k) = \sqrt{\frac{2}{\gamma-1}\left(\frac{T_{T_m}}{\hat{T}_s(z_{P_m}, t_k)} - 1\right)} - \sqrt{\frac{2}{\gamma-1}\left(\left(\frac{P_{T_m}}{\zeta(z_{P_m})}\right)^{\frac{\gamma-1}{\gamma}} - 1\right)},$$

in which:
γ corresponds to the adiabatic coefficient of the air,
$T_{T_m}$ corresponds to the measured total temperature flight parameter,
$P_{T_m}$ corresponds to the measured total pressure,
$z_{P_m}$ corresponds to the measured pressure altitude,
ζ corresponds to the function linking the measurement of the pressure altitude to the static pressure, and
$\hat{T}_s(z_{P_m}, t_k)$ corresponds to an estimation of the static temperature.

The estimation of the static temperature $\hat{T}_s(z_{P_m}, t_k)$ is recomputed from the parameters estimated at the current time instant $t_k$ and preceding time instant $t_{k-1}$ as a function of the value of the residue $r_1$, according to the formula:

$$\hat{T}_s(z_{P_m}, t_k) = T_{15} + \\ G_{T_{z0}}\left(z_{P_m}(t_k) + \mathcal{L}(s)\left[\hat{C}_{b_x}(t_k)\Pi_{r_1^+}(r_1(t_k)) + \hat{C}_{b_x}(t_{k-1})\left(1 - \Pi_{r_1^+}(r_1(t_k))\right)\right]\right) + \\ \mathcal{L}(s)\left[\overline{\Delta ISA}(t_k)\Pi_{r_1^+}(r_1(t_k)) + \overline{\Delta ISA}(t_{k-1})\left(1 - \Pi_{r_1^+}(r_1(t_k))\right)\right],$$

in which $\mathcal{L}$ is the transfer function of a low-pass filter and $$\Pi_{r_1^+}(r) = H\left(r + \frac{r_1^+}{2}\right) - H\left(r - \frac{r_1^+}{2}\right)$$

where H is the Heaviside function, and $$r\frac{+}{\underline{1}}$$

corresponds to the limits associated with the residue $r_1$ defined hereinafter in the description.

A third residue has for expression at the instant $t_k$, $$r_3(t_k) = \sqrt{\frac{2}{\gamma-1}\left(\frac{T_{T_m}}{\hat{T}_s(z_{P_m}, t_k)} - 1\right)} - \sqrt{\frac{2mgn_{z_{1_m}}\cos\alpha_m}{\gamma S \zeta(z_{P_m})\hat{C}_z} - n_{X_{1_m}}\tan\alpha_m}$$

in which:
m corresponds to the current weight of the aircraft AC,
S corresponds to the reference surface of the aircraft AC,
g corresponds to the acceleration of gravity, γ corresponds to the adiabatic coefficient of the air, $n_{Z_{1_m}}$ corresponds to the measured vertical load factor, $n_{X_{1_m}}$ corresponds to the measured longitudinal load factor,
$\alpha_m$ corresponds to the measured angle of incidence,
$z_{P_m}$ corresponds to the measured pressure altitude,
$T_{T_m}$ corresponds to the measured total temperature,
ζ corresponds to the function linking the measurement of the pressure altitude to the static pressure,
$\hat{T}_s(z_{P_m}, t_k)$ corresponds to the estimation of the static temperature defined in the residue $r_2$, and
$\hat{C}_z$ corresponds to the lift coefficient computed from the estimated parameters relating to the flight.

In a nonlimiting manner, the first residue $r_1$ is filtered over a time $\tau_{r_c}$ of a few seconds, whereas the residues $r_2$ and $r_3$ are forced to a nil value as long as the geometrical altitude $z_G$ of the aircraft AC is less than a limit altitude chosen in a nonlimiting manner to be 7000 feet (approximately 2133.6 m) because of the inaccuracies of the expression expressing the pressure altitude $$z_{P_m} = \frac{z_G}{1 + \frac{\Delta ISA}{T_{15}}} - C_{b_x}$$

below 7000 feet.

For example, the time $\tau_{r_c}$ is equal to 10 s.

For the determination of the status of the sensors C1, C2, . . . CN and of the parameter P1 corresponding to the current weight of the aircraft AC, the detection submodule 51 is configured to:
  assign to each residue $r_i$ a maximum limit $r_i^+$ and a minimum limit $r_i^-$ with i lying between 1 and 3;
  construct two validity indicators in Boolean form $V_{P_S}$ and $V_{P_T}$ associated with the static pressure and total pressure sensors from the estimated parameters and the measurements derived from the sensors of the aircraft;
  deduce therefrom residue indicators $R_i$ associated with each residue $r_i$ and validity indicators $V_i$;
  identify the occurrence of a failure when the sum of the residue indicators is strictly greater than zero ($\Sigma R_i > 0$) and identify (or isolate), in case of failure, the faulty sensor by comparing the current values of the residue indicators to those itemized in a table identified offline or online itemizing the failure cases as a function of the different combinations of values of the residue indicators $R_i$.

The validity indicators $V_{P_S}$ and $V_{P_T}$ are constructed as follows.

The validity indicator $V_{P_S}$ has the value 1 if the relationship $|\mathcal{L}_h(s)(z_{P_m}, z_{G_m})| \leq l_{P_S}$ is borne out. $V_{P_S}$ has the value 0 if said relationship is not borne out.

The term $l_{P_S}$ corresponds to a limit determined experimentally as a function of the dynamics of the aeroplane. The term $\mathcal{L}_h$ corresponds to a transfer function of a high-pass filter with a time constant chosen in a nonlimiting manner to be a few seconds, for example 30 s.

The validity indicator $V_{P_T}$ has the value 1 if the residue $r_1$ crosses its respective limits, at an instant $t_k$, and that $\exists n \in \mathbb{N}$ such that $t_0 \in [t_k - \tau_{P_T}, t_k]$ bearing out $|(1-\mathcal{L}_\tau)(M_{P_T}(t_n) - M_{P_T}(t_{n-j}))| \leq l_{P_T}$, with:
  $\tau_{P_T}$ corresponding to a constant chosen in a nonlimiting manner to be 120 seconds,
  $\mathcal{L}_\tau$ corresponding to a transfer function of a low-pass filter having for time constant τ chosen in a nonlimiting manner to be a few hundreds of seconds, for example 700 s,
  $j \in \mathbb{N}$ corresponding to a constant chosen in a nonlimiting manner to be equal to 8, and
  $l_{P_T}$ corresponding to a limit determined experimentally as a function of the dynamics of the aeroplane.

To deduce a residue indicator $R_i$ associated with a residue $r_i$, reference is made to the value of the residue $r_i$. If the value of the residue $r_i$ is respectively greater or smaller than the maximum limit $r_i^+$ or the minimum limit $r_i^-$, the residue indicator $R_1$ is equal to 1, otherwise the residue indicator $R_1$ is equal to zero. In the case of a residue indicator $R_i$ associated with a validity indicator $V_i$, the residue indicator $R_i$ is equal to the validity indicator $V_i$.

Each column of the table, itemizing the failure cases as a function of the different combinations of values of the residue indicators $R_i$, corresponds to a fault index $FI_i$ (fault indicator) and is the combination of residue indicators $R_1$, $R_2$ . . . $R_m$ that can take 0 or 1 for value and each row corresponds to the values of a residue indicator $R_i$ for each of the fault indexes $FI_1, FI_2, \ldots FI_m$ constructed. A fault index $FI_i$ refers to the status of the sensor $Ci$, except in a first instance of the sensor measuring the angle of incidence C1 for which the fault index $FI_{\alpha/m}$ refers to a common status of the measurement of the angle of incidence measured by an angle-of-incidence measurement sensor C1 and of the parameter P1 of current weight of the aircraft.

The maximum limit $r_i^+$ and the minimum limit $r_i^-$ are determined from thresholds $$r_i^{+}_{-},$$

tabulated as a function of estimated flight parameters, centred on a central residue value $r_{i_m}$ which corresponds to the residue $r_i$ filtered for a time $\tau_i$ which depends on each residue. Thus, the maximum limit $r_i^+$ has for expression $$r_i^+ = r_{i_m} + r_i^{+}_{-}$$

and the minimum limit $r_i^-$ has for expression $$r_i^- = r_{i_m} - r_i^{+}_{-}.$$

The definition of the thresholds $$r_i^{+}_{-}$$

can be done in many ways. Preferentially, the threshold is chosen to be symmetrical about a filtered value, denoted $r_{i_m}$, of the raw residue over a time $\tau_r$ that is sufficiently great. The distance $$\left| r_i^{\pm} - r_{i_m} \right|$$

can depend on the accuracy of a modelling and on the accuracy of sensors C1, C2, . . . CN. In the chosen application case, it can be a function of the Mach, of the configuration of the aircraft AC, of the control surface deflections but also of the diagonal elements of the covariance matrix of the error computed via the adaptive extended Kalman filter previously described:

$$\left| r_i^{\pm} - r_{i_m} \right| = \sigma_i(M, conf)(1 + u_i P u_i^T)^{1/2},$$

in which $u_i$ is a dependency vector making it possible to link the influence of each state to the measurement i.

In order to avoid including thresholds in case of failure, it is recommended to introduce saturators to force $r_i^+$ and $r_i^-$ to remain within a realistic predefined interval:

$$\forall i, \begin{cases} r_i^+ \in [r_{i_{min}}^+, r_{i_{max}}^+] \\ r_i^- \in [r_{i_{min}}^-, r_{i_{max}}^-] \end{cases}.$$

The threshold $r_1^{\pm}$ for the first residue $r_1$ is defined as a function of the confidence that is placed on the model of the lift coefficient $C_L$. It can for example depend on the configuration of the aircraft AC, on the Mach number, on the position of the landing gears of the aircraft AC (lowered or retracted), on the position of the control surfaces whose effects have not been taken into account in the modelling and on the accuracy of the incidence probes. In a nonlimiting manner, the filtering time $\tau_r^1$ is chosen to be 500 seconds.

The thresholds $$r_2^{\pm} \text{ and } r_3^{\pm}$$

for the second residue $r_2$ and the third residue $r_3$ are defined according to a different logic given that they are associated with Mach measurement deviations. Their value can depend on the accuracy of the anemometric measurement sensors and on the estimated or measured flight parameters such as the geometrical altitude $z_G$.

For the isolation of a failure, the algorithm of the detection submodule 51 refers to the combinations of the failure table below. The acronym FI refers to the fault indicator whereas the index f=0 refers to the nominal case (that is to say in the absence of failure before the detection of the fault) and f>0 in the case of degraded operation (the measurement of at least one parameter has already been detected as faulty and is therefore no longer used by the system). $R_{v1}$ and $R_{v2}$ are associated respectively with the validity indicators $V_{P_S}$ and $V_{P_T}$.

|           | $FI_{\alpha/m,f=0}$ | $FI_{P_T,f=0}$ | $FI_{P_S,f=0}$ | $FI_{T_T,f=0}$ |
|-----------|---------------------|----------------|----------------|----------------|
| $R_1$     | 1                   | 1              | 0/1            | (0/1)          |
| $R_2$     | 0/1                 | 0/1            | 0/1            | 1              |
| $R_3$     | 0                   | 0/1            | 0/1            | 1              |
| $R_{v1}$  | 0                   | 0              | 1              | 0              |
| $R_{v2}$  | 0                   | 1              | 0              | 0              |

These combinations depend on the setting of the estimator and, more particularly, on the accuracy of the sensors C1, C2, . . . , CN used. They are determined offline or online via a dedicated algorithm. The notation '0/1' refers to the values of the residue indicators that do not have an impact for the isolation of the failure, the isolation being satisfied via the other dependencies.

Depending on the combination of 1 and of 0 obtained on the different failure indicators FI, a deduction is made therefrom as to whether there is a failure and its origin.

For example, the status of the total pressure sensor $P_T$ corresponds to a failure when $R_1$ and $R_{v2}$ are equal to 1. The common status of the sensor of angle of incidence $\alpha$ and of the weight m corresponds to a failure state if $R_1$ is equal to 1 and $R_3$, $R_{v1}$ and $R_{v2}$ are equal to zero.

The submodule 51 for detecting a failing sensor C1, C2, . . . , CN makes it possible both to detect and isolate the fault, with an indeterminacy to be lifted between a fault on the measurement of the angle of incidence $\alpha$ and on the current weight m, reflected by the notation $\alpha/m$ in $FI_{\alpha/m,f=0}$ which refers to both $FI_{\alpha,f=0}$ and $FI_{m,f=0}$ given that they have the same signature and are therefore merged. The validation submodule 52 makes it possible to lift the ambiguity.

In the case where a first failure has already been detected (f>0), the fault indicators for the valid sensors (with which the fault indexes $R_j$ are associated) can be reduced to a simple indicator:

$FI_{f>0}=1$ if $\Sigma R_j>0$

The detection of the failure will then be possible while the identification of the source will not be able to be made directly without the addition of information external to the system described. Abrupt failures do nevertheless remain detectable and isolatable via the use of the preceding dependency matrix by considering only the sensors C1, C2, . . . , CN, the residues $r_1$, $r_2$, $r_3$ and the validity indicators $V_{P_S}$, $V_{P_T}$ that are still valid.

These indicators are then communicated to the validation submodule 52 with the current value of the weight m and the estimation of the lift coefficient modelling bias $\hat{b}_{C_L}$, of the lift coefficient $C_L$ and of the first residue $r_1$.

The validation submodule 52 makes it possible to distinguish a fault on the incidence sensors C1 from a weight error. This validation submodule 52 nevertheless requires a minimum of variation of the angle of incidence $\alpha$ to work. An indicator that will be called "dynamic indicator" here is therefore established in order to validate the results obtained.

As soon as the detection submodule returns a fault on the incidence $\alpha$ or the weight m, the maximum deviation of variation of weight m is computed from the instant $t_1$ of detection.

From the estimation of the first residue $r_1$, the following weight error m is computed at each instant t:

$$\Delta m = m \frac{C_{L_\alpha}(conf) r_1}{\hat{C}_L},$$

in which $\hat{C}_L$ corresponds to the estimation of the lift coefficient, $C_{L_\alpha}(\text{conf})$ to the coefficient $C_{L_\alpha}$ derived from a simplified model that is only a function of the configuration of the aircraft AC and m the current weight of the aircraft AC.

The dynamic indicator is defined on the value of the incidence $\alpha$. Given that the measurement thereof can be incorrect, a virtual incidence $\alpha_v$ is constructed from the raw measurement of the estimated modelling bias $\alpha_m$ and the residue associated with the incidence $r_{c_\alpha}$:

$$\alpha_v = \alpha_m - r_{c_\alpha}$$

In this way, the virtual incidence $\alpha_v$ will compensate any failure on the measured incidence. The latter will nevertheless still be affected by a weight error m which will introduce a bias but its variation $\Delta\alpha_v$ will be identical to that of the real incidence.

A first variant for the definition of the virtual incidence corresponds to the integration of the following formula:

$$\dot{\alpha}_v \approx q + g(1 - n_{z_1})/\hat{V},$$

in which:

g is the acceleration of gravity, q corresponds to the angular pitch speed, $n_{z_1}$ corresponds to the measurement of the vertical load factor expressed in the reference frame associated with the aircraft AC, $\hat{V}$ corresponds to the estimation of the air speed.

The auxiliary measurement vector Z is then increased by the measurement q corresponding to the angular pitch speed measurement in the reference frame of the aircraft.

The variation of the virtual incidence $\Delta\alpha_v$ has for expression:

$$\Delta\alpha_V(t) = \max_{(t_i, t_j) \in [t_1, t]} |\alpha_V(t_i) - \alpha_V(t_j)|$$

There is then defined a minimum variation threshold that has to be reached by the virtual incidence $\Delta\alpha_v$ from the detection of the failure in order to allow the isolation of the failure between an angle of incidence $\alpha$ measurement error and an incorrect current weight m, and in the second case, the evaluation of the associated weight error via a second computation. $t_2$ is then defined such that:

$$t_2 = \min_{\Delta\alpha_V(t_2) > \Delta\alpha_{lim}} t$$

A second threshold on the estimated weight variation makes it possible to deduce therefrom whether the latter is sufficiently great to be associated with a fault of the angle of incidence sensor C1. This threshold depends for example on the quality of the modelling used for the lift coefficient $C_L$.

The maximum deviation of weight variation $\Delta^2 m$ is deduced therefrom from the instant $t_1$ of detection to the instant $t_2$:

$$\Delta^2 m = \max_{(t_i, t_j) \in [t_1, t_2]} |\Delta m(t_i) - \Delta m(t_j)|$$

$\Delta^2 m_{lim}$ is defined as the maximum variation limit that makes it possible to deduce therefrom whether the failure can be identified as a fault of the angle of incidence sensors C1 or as a current weight m error:

if $\Delta^2 m < \Delta^2 m_{lim}$ then $FI_{\alpha, f=0} = 0$ $FI_{m, f=0} = 1$ else $FI_{\alpha, f=0} = 1$ $FI_{m, f=0} = 0$ The validation submodule 52 finally makes it possible to establish the fault indicators associated with the incidence $FI_{\alpha, f=0}$ and with the weight $FI_{m, f=0}$.

There is nevertheless a type of failure on the incidence $\alpha$ that can lead to a bad interpretation:

$$\begin{cases} \alpha_{err}(t) = \alpha(t) + \Delta\alpha(t) \\ \Delta\alpha(t) = K(\alpha(t) - \alpha_0) \end{cases}$$

This is a fault of scale factor type on the incidence $\alpha$. All the other types of failures are correctly identified. In order to minimize this type of error, two additional checks are possible. First of all, check that the estimated weight is situated within the interval between the minimum and maximum weight on take-off defined for the aircraft AC. Then, a request to verify the weight input on take-off by the pilot is possible as is the case applied in certain situations.

In a first variant embodiment, it is possible to integrate the engine measurements and considerably increase the observability of the system and therefore the detection capabilities of the algorithm via the addition of a modelling called engine-nacelle modelling described hereinabove. For that, three new observations are integrated:

the virtual total pressure derived from the engine-nacelle modelling $P_{T_{eng}}$, the virtual static pressure derived from the engine-nacelle modelling $P_{S_{eng}}$, the total engine temperature $T_{T_{eng}}$.

These two virtual measurements are derived from the engine-nacelle modelling using only the static engine pressure $P_{mot}$ and the static pressure measured in the nacelle $P_{nac}$ and the total engine temperature $T_{T_{eng}}$. They exhibit two common failure modes given that a failure of one of the two static pressures leads to a fault of the virtual static pressure and of the virtual total pressure and that a fault of the total engine temperature leads to a fault thereof and of the two virtual measurements.

Thus, the observation vector has for expression:

$$Y = \begin{pmatrix} \alpha_m = \operatorname{atan}\left(\dfrac{w}{u}\right) \\ \beta_m = \operatorname{atan}\left(\dfrac{v}{\sqrt{u^2+w^2}}\right) \\ P_{S_m} = \zeta(z_p) \\ n_{Z_m} = \dfrac{SP_d(C_L + bc_L)}{mg\cos\alpha} + n_{X_{1_m}} \tan\alpha \\ P_{T_m} = P_S\left(1 + \dfrac{\gamma-1}{2}M^2\right)^{\frac{\gamma}{\gamma-1}} \\ T_{T_m} = T_S\left(1 + \dfrac{\gamma-1}{2}M^2\right) \\ P_{T_{eng}} = P_S\left(1 + \dfrac{\gamma-1}{2}M^2\right)^{\frac{\gamma}{\gamma-1}} \\ P_{S_{eng}} = \zeta(z_p) \\ T_{T_{eng_m}} = T_S\left(1 + \dfrac{\gamma-1}{2}M^2\right) \end{pmatrix}$$

in which $P_{T_{eng}}$ corresponds to a total pressure value derived from the nacelle-engine modelling, $P_{S_{eng}}$ corresponds to a static pressure value derived from the modelling, and $T_{T_{eng_m}}$ corresponds to a measured total temperature value derived from the total engine temperature measurement.

When setting the Kalman filter, a choice will be made not to use the engine measurements to update the estimated states. They will be used only for the detection and will then replace the measurement missing after certain failure cases.

The variance specified on each other sensor is otherwise used for the setting of the filter.

The sensors C1, C2, . . . , CN considered are those of the first variant to which are added the total engine temperature sensor $T_{T_{eng}}$ and the virtual sensors of static pressure $P_{S_{eng}}$, and of total engine pressure $P_{T_{eng}}$.

The residues generated are as follows:

a fourth residue $r_4$ having for expression $$r_4(t_k) = \varepsilon_{P_{T_{eng}}}(t_k)$$

in which $$\varepsilon_{P_{T_{eng}}}(t_k)$$

corresponds to the difference at a time ($t_k$) between the measured value of the total pressure and said virtual measurement derived from the engine-nacelle modelling $P_{T_{eng}}$, a fifth residue $r_5$ having for expression $$r_5(t_k) = \varepsilon_{P_{S_{eng}}}(t_k) \text{ in which } \varepsilon_{P_{S_{eng}}}(t_k)$$

corresponds to the difference at a time ($t_k$) between the measured static pressure value and said virtual measurement derived from the modelling $P_{S_{eng}}$, and a sixth residue $r_6$ having for expression $$r_6(t_k) = \varepsilon_{T_{T_{eng}}}(t_k) \text{ in which } \varepsilon_{T_{T_{eng}}}(t_k)$$

corresponds to the difference at a time ($t_k$) between the measured total temperature value and said engine measurement $T_{T_{eng}}$.

In a nonlimiting manner, the residues $r_i$ generated in the estimation substep can also be filtered over a time $\tau_{r_c}$.

The thresholds $$r_4^\pm, r_5^\pm \text{ and } r_6^\pm$$

associated respectively with the residues $r_4$, $r_5$ and $r_6$ to determine the maximum limit and the minimum limit depend on the accuracy of the model associated with the virtual engine sensors and on the accuracy of the engine $P_{eng}$, nacelle $P_{nac}$ static pressures and of the total temperature sensor which feed it.

For the detection of a failure, the algorithm of the detection submodule 51 then refers to the fault indexes defined according to the combinations of the failure table below.

|  | $FI_{\alpha/m,f=0}$ | $FI_{P_T,f=0}$ | $FI_{P_S,f=0}$ | $FI_{T_T,f=0}$ | $FI_{P_{eng},f=0}$ | $FI_{T_{T_{eng}},f=0}$ |
|---|---|---|---|---|---|---|
| $R_1$ | 1 | 1 | 0/1 | (0/1) | 0 | 0 |
| $R_2$ | 0/1 | 0/1 | 0/1 | 1 | 0 | 0 |
| $R_3$ | 0 | 0/1 | 0/1 | 1 | 0 | 0 |
| $R_4$ | 0 | 0 | 1 | 0 | 1 | 0/1 |
| $R_5$ | 0 | 1 | 0 | 0 | 1 | 0/1 |
| $R_6$ | 0 | 0 | 0 | 1 | 0 | 1 |
| $R_{v1}$ | 0 | 0 | 0/1 | 0 | 0 | 0 |
| $R_{v2}$ | 0 | 0/1 | 0 | 0 | 0 | 0 |

This first variant has the advantage of a great number of observations. Consequently, it is possible to isolate the source of a failure much more rapidly than previously by means of the indicators marked by the notation '1'. Conversely, although the notation '0/1' reflects a possible overshoot of the associated threshold, the latter does not need to be identified to rapidly isolate the failure, the isolation being satisfied via the other dependencies. These combinations depend on the setting of the estimator and more particularly on the accuracy of the sensors C1, C2, . . . , CN used, as evidenced by the notation '(0/1)' which reports a possible overshoot as a function of the chosen setting. They are determined offline by the use or online via a dedicated algorithm.

Once a first failure is detected and isolated, it is possible to continue the monitoring by using the residues that are still relevant. For example, in case of failure of the measurements derived from the engine model, it will be reduced to the formulation of the standard embodiment. It is therefore possible to detect and isolate at least two successive sensor failures and to reconstitute the missing parameters. Beyond, the level of observability may no longer be sufficient and some states may be frozen to continue to ensure the stability of the filter. The failure detection will nevertheless still be able to be ensured in some cases.

In a second variant, it is possible to integrate in particular a kinematic model allowing a monitoring and an estimation of the ground parameters including the biases of the accelerometers $$b_{n_{x_1}}, b_{n_{y_1}}, b_{n_{z_1}}$$

on the three axes of the aircraft. This second variant is of interest because air space is these days undergoing a few difficulties with the GPS signals, particularly when flying over territory using GPS scramblers as is the case in some countries at war. In this case, the GPS measurements may no longer be available. In order to avoid an unpredicted removal of the detector estimator filter, it is necessary to ensure the detection of a removal of the GPS measurements in order to leave control to the inertial sensors for the time of their unavailability. The estimation of the accelerometric biases makes it possible to refine the estimation of the ground parameters in the absence of GPS measurements.

In this second variant, the state vector X has for expression:

$$X = \begin{pmatrix} W_{x_0} \\ W_{y_0} \\ W_{z_0} \\ \Delta ISA \\ b_{C_L} \\ C_{b_x} \\ v_{gx_0} \\ v_{gy_0} \\ v_{gz_0} \\ b_{n_{x_1}} \\ b_{n_{y_1}} \\ b_{n_{z_1}} \\ z_G \end{pmatrix},$$

in which:

$$V_{gx_{0_m}}, V_{gy_{0_m}}, V_{gz_{0_m}}$$

correspond to the three components of the ground speed in the Earth's reference frame, $$b_{n_{x_1}}, b_{n_{y_1}}, b_{n_{z_1}}$$

correspond to the three bias components of accelerometers in the reference frame associated with the aircraft AC, $z_G$ corresponds to a geometrical altitude.

The derivative of the state vector has for expression:

$$\dot{X} = \begin{pmatrix} \dot{W}_{x_0} = 0 \\ \dot{W}_{y_0} = 0 \\ \dot{W}_{z_0} = 0 \\ \Delta \dot{ISA} = 0 \\ \dot{b}_{C_L} = -\frac{b_{C_L}}{\tau_b} \\ \dot{C}_{b_x} = 0 \\ \begin{pmatrix} \dot{v}_{gx_0} \\ \dot{v}_{gy_0} \\ \dot{v}_{gz_0} \end{pmatrix} = -g * M_{rot} \begin{pmatrix} (n_{x_{1_m}} + b_{nx}) \sin\theta \\ (n_{y_{1_m}} + b_{ny}) \cos\theta \sin\phi \\ (n_{z_{1_m}} + b_{nz}) \cos\theta \cos\phi \end{pmatrix} \\ \dot{b}_{n_{x_1}} = 0 \\ \dot{b}_{n_{y_1}} = 0 \\ \dot{b}_{n_{z_1}} = 0 \\ \dot{b}_{n_{z_1}} = 0 \\ \dot{z}_G = V_{gz_0} \end{pmatrix},$$

in which $$M_{rot} = \begin{pmatrix} \cos\theta\cos\psi & \sin\phi\sin\theta\cos\psi - \cos\phi\sin\psi & \cos\phi\sin\theta\cos\psi + \sin\phi\sin\psi \\ \cos\theta\sin\psi & \sin\phi\sin\theta\sin\psi + \cos\phi\cos\psi & \cos\phi\sin\theta\sin\psi - \sin\phi\cos\psi \\ \sin\theta & -\sin\phi\cos\theta & -\cos\phi\cos\theta \end{pmatrix}.$$

The auxiliary measurement vector Z is increased by the measurement $$n_{y_{1_m}}$$

corresponding to the measurement of the lateral load factor in the reference frame of the aircraft.

The observation vector Y therefore has for expression:

$$Y = \begin{pmatrix} \alpha_m = \operatorname{atan}\left(\frac{w}{u}\right) \\ \beta_m = \operatorname{atan}\left(\frac{v}{\sqrt{u^2+w^2}}\right) \\ P_{S_m} = \zeta(z_P) \\ n_{Z_{1_m}} = \frac{\gamma S P_s M^2 (C_L + b_{C_L})}{2\,mg\,\cos\alpha} + n_{X_{1_m}}\tan\alpha \\ P_{T_m} = P_S\left(1 + \frac{\gamma-1}{2}M^2\right)^{\frac{\gamma}{\gamma-1}} \\ T_{T_m} = T_S\left(1 + \frac{\gamma-1}{2}M^2\right) \\ V_{gx_{0_m}} = V_{gx_0} \\ V_{gy_{0_m}} = V_{gy_0} \\ V_{gz_{0_m}} = V_{gz_0} \\ z_{G_m} = z_G \end{pmatrix},$$

in which:

$V_{gx_{0_m}}, V_{gy_{0_m}}, V_{gz_{0_m}}$ correspond to measurements of the three components of the ground speed, and $z_{G_m}$ corresponds to a measurement of the geometrical altitude.

This second variant can be coupled or not with the first variant for a more comprehensive formulation and therefore greater performance. This nevertheless has the disadvantage of being more complex and therefore of having a much higher computational impact as well as a more difficult setting of the estimator filter.

The knowledge of the kinematic model makes it possible to perform the monitoring of the GPS measurements via the study of the residues associated with the new states introduced and of the trend of the accelerometric biases $b_{n_{x_1}}, b_{n_{y_1}}, b_{n_{z_1}}$.

In nominal operation, this is done at low frequency and with a low amplitude. Conversely, any failure of the GPS measurements leads to abrupt modifications of great amplitude.

According to a third variant, the lateral component of the air speed v is assumed nil, which amounts to considering the side slip p as nil. This is true most of the time. Some situations such as engine failure can invalidate this assumption. Nevertheless the side slip values in all cases remain relatively low and even in case of strong variations of the side slip angle, that affects the estimation and detection process and the performance levels thereof only very little. This assumption therefore only introduces very little in the way of errors whereas it makes it possible to dispense with any monitoring on the side slip probes (which would otherwise have required establishing a lateral model of the aircraft AC). A coupling with the previous variants described is possible.

According to a second embodiment (FIG. 1), the statuses associated with some of said sensors C1, C2, . . . CN are also determined from auxiliary statuses associated with these sensors that can be sent to the detection module by an external monitoring module COMP4 9. The detection submodule 51 then takes care of translating the statuses sent by the external monitoring module 9 before transmitting the translated statues to the estimation module 4. This second embodiment can be combined with the other embodiments.

Figure 4:
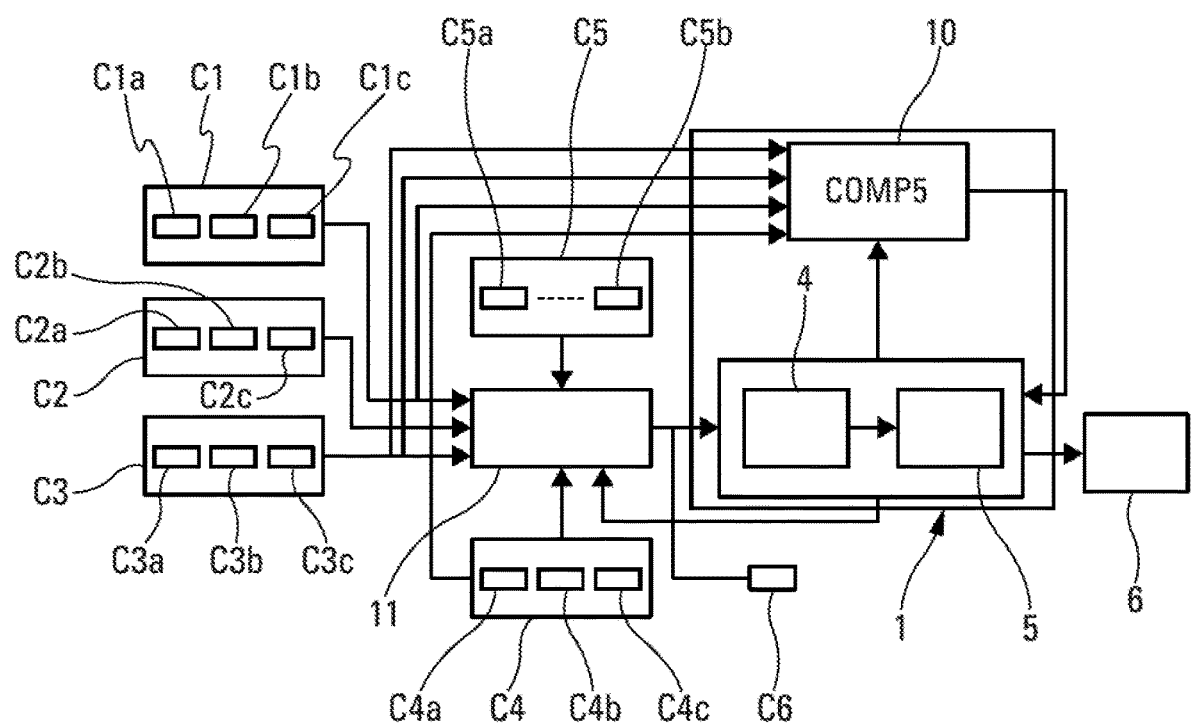
FIG. 4 represents a block diagram of the embodiment of the monitoring and estimation device in which the aircraft uses hardware redundancy.

According to a third embodiment represented in FIG. 4, in the case where the aircraft AC uses hardware redundancy, the inputs of the estimation module 4 correspond initially to the consolidated measurements as they are derived from the output of a vote module 11 based on a majority-based vote. It is however possible to imagine cases of figures where the consolidated measurement is invalidated by the vote module 11 and is therefore faulty, but that one of the sensors of the corresponding type is still valid, which may be the case with some common failure modes. In this case, it is advantageous to have the capacity to recover the measurement that is still valid. FIG. 4 represents several sets of redundant sensors C1, C2, C3, C4, C5, C6 comprising one or more sensors. For example, the set of sensors C1 comprises sensors C1a, C1b, C1c of angle of incidence. The set of sensors C2 comprises sensors C2a, C2b, C2c of static pressure. The set of sensors C3 comprises sensors C3a, C3b, C3c of total pressure. The set of sensors C4 comprises sensors C4a, C4b, C4c of total temperature. The set of sensors C5 comprises sensors C5a and C5b correspondingly respectively to a satellite geolocation system assembly and an inertial unit assembly. The set of sensors C6 corresponds to virtual sensors of virtual total pressure $P_{T_{eng}}$, of the virtual static pressure $P_{S_{eng}}$ derived from the engine-nacelle modelling and from the total engine temperature $T_{T_{eng}}$.

The monitoring and estimation device 1 comprises a unitary verification module COMP5 10. When a failure is detected for a measurement used as input for the estimation module, the unitary verification module is configured to:

reconfigure the estimation submodule 42 to not take account of the faulty measurement, after a convergence time $\tau_{cv}$, compute the differences between the estimations of said parameters relating to the flight and each of the measurements derived from the plurality of sensors. For each of the measurements derived from the plurality of sensors, if the absolute value of the difference is less than a predetermined value, the corresponding measurement is retained for the estimation submodule 42.

A possible variant relates to the use of methods similar to the extended Kalman filter, using the same set of equations as the integration of an unscented Kalman filter, of particle filters, or any similar variant by using their respective procedures and the equations given hereinabove.

Figure 2:
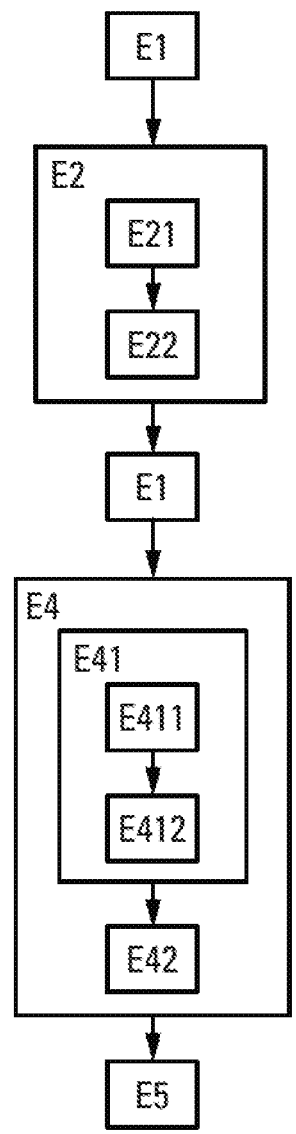
FIG. 2 represents steps of the monitoring and estimation method.

The device 1 for monitoring and estimating parameters relating to the flight of an aircraft AC as described hereinabove implements a method (FIG. 2) comprising:

an initialization step E1, implemented by the initialization module 3, consisting in initializing statuses of sensors C1, C2, . . . , CN configured to determine the flight parameters of the aircraft AC and a parameter P1 corresponding to the weight of said aircraft AC and in initializing parameters used in the implementation of the monitoring and estimation method 1.

The method further comprises the following steps, implemented iteratively:

an estimation step E2, implemented by the estimation module 4, consisting in determining an estimation of the values of the parameters relating to the flight of the aircraft AC and an estimation of the error of said weight, from:

measurements of the parameters relating to the flight supplied by the sensors C1, C2, ... CN, parameters relating to the flight initialized in the initialization step or estimated on the preceding iteration of the estimation step E2 and statuses associated with each of said sensors C1, C2, ..., CN, the estimation step E2 consisting also in generating residues $r_i$ which are functions of the measured and estimated values of the parameters relating to the flight and of innovation terms which correspond to the difference between a measured flight parameter value and said estimated value;

a first transmission step E3, implemented by the first transmission module 7, consisting:

in transmitting to a user device 6 and to the detection module 5 a signal representative of the estimation of the values of the parameters relating to the flight of the aircraft AC and of the weight error, determined in the estimation step E2, in sending a signal representative of the residues generated in the estimation step E2 to said detection module 5;

a detection step E4, implemented by the detection module 5, consisting in determining the different statuses associated with each of said sensors C1, C2, ..., CN and with a parameter P1 corresponding to a current weight of the aircraft AC, from:

said residues determined in the estimation step, the estimation of the values of the parameters relating to the flight and the estimated weight error, determined in the estimation step E2, said statuses determined on the preceding iteration or initialized in the initialization step;

a second transmission step E5, implemented by the second transmission module 8, consisting in transmitting to the user device 6 and, on the next iteration, to the estimation module 4 the different statuses associated with each of said sensors C1, C2, ..., CN and the status associated with said parameter P1 corresponding to the current weight.

Furthermore, the estimation step E2 comprises the following substeps:

an adaptation substep E21, implemented by the adaptation submodule 41, consisting in determining a variance and/or a validity Boolean associated with each of the measurements of the parameters relating to the flight supplied by the sensors C1, C2, ..., CN and of the setting parameters associated with the estimation algorithm used in the estimation substep E22, from:

said measurements of the parameters relating to the flight and from the statuses associated with each of said sensors C1, C2, ..., CN; the adaptation substep E21 consisting also in correcting the current weight from a weight error estimated on the preceding iteration or initialized in the initialization step E1, and from a status associated with the parameter corresponding to the weight, an estimation substep E22, implemented by the estimation submodule 42, consisting in determining the estimation of the values of the parameters relating to the flight and an estimation of the error of said weight from:

the measurements of the parameters relating to the flight supplied by said sensors C1, C2, ..., CN, the parameters relating to the flight estimated on the preceding iteration or initialized in the initialization step E1 and from the variance and/or the validity Boolean of each of the measurements of the parameters relating to the flight and of the setting parameters determined in the adaptation substep E21, the estimation substep E22 consisting also in generating the residues from the estimated and measured parameters relating to the flight and the innovation terms.

Furthermore, the detection step E4 comprises the following substeps:

a substep E41 of detection of a failing sensor and of incorrect parameters relating to the flight, implemented by a detection submodule 51, consisting in determining:

the common status associated with the sensor C1 configured to measure the angle of incidence α of the aircraft AC and with the parameter P1 corresponding to the current weight and the status associated with the other sensors (C2, C3, ..., CN), from:

the measurements of the parameters relating to the flight supplied by said sensors C1, C2, ..., CN, the estimation of the values of the parameters relating to the flight, the statuses associated with each of said sensors C1, C2, ..., CN and with a parameter P1 corresponding to a current weight of the aircraft (AC) determined on the preceding iteration or initialized in the initialization step E1, and the residues;

a substep E42 of validation of the angle of incidence and of the current weight, implemented by a validation submodule 52, consisting in determining the status associated with the parameter P1 corresponding to the current weight and the status associated with the sensor C1 configured to measure the angle of incidence α, from:

the common status associated with the sensor C1 configured to measure the angle of incidence α of the aircraft AC and with the parameter P1 corresponding to the current weight, the statuses associated with the other sensors C2, C3, ..., CN, the estimated parameters relating to the flight, the estimated weight error, the measured parameters relating to the flight, the residues generated in the estimation substep E22 and a lift coefficient $C_L$ supplied from an embedded modelling fed by the parameters relating to the flight estimated and measured by the sensors C1, C2, ..., CN.

The determination of the status of the sensors C2, ..., CN and of the common status associated with the status of the sensor C1 and with the parameter P1 corresponding to the weight, in the failing sensor detection substep E41, comprises the following substeps:

a substep E411 of assignment to each residue of a maximum limit $r_i^+$ and a minimum limit $r_i^-$, of construction of validity indicators $V_i$ then of residue indicators $R_i$ associated with each residue $r_i$ and validity indicator $V_i$;

a substep E412 of identification of failures (E $R_i>0$) and of isolation of the source thereof by identifying the combination of the current values of the residue indicators $R_i$ with those itemized in a table pre-identified offline in a preferred embodiment, itemizing the failure case as a function of the different combinations of values of the residue indicators $R_i$. Each column of the table corresponds to a fault index $FI_i$ and is the combination of residue indicators $R_1, R_2 \ldots R_m$ that can take 0 or 1 for value and each row corresponds to the values of a residue indicator $R_i$ for each of the fault indexes $FI_1, FI_2, \ldots FI_m$ constructed. A fault index $FI_i$ refers to the status of the sensor Ci, except in a first instance of the sensor measuring the incidence C1 for which the fault index $FI_{\alpha/m}$ refers to a common status of the measurement of the angle of incidence measured by an angle-of-incidence measurement sensor C1 and of the parameter P1 corresponding to the weight of the aircraft.

Figure 3:
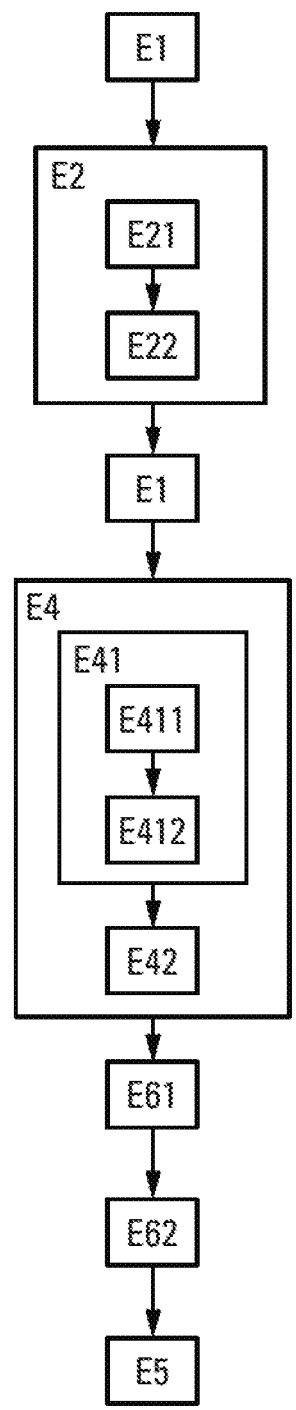
FIG. 3 represents substeps implemented in another embodiment in which the aircraft uses hardware redundancy.

For a flight parameter that is consolidated and therefore measured from a plurality of sensors (FIG. 3), the method comprises the following substeps implemented by a unitary verification module 10, when a failure is detected for the measurement used as input for the estimation submodule 42 for said flight parameter:

a substep E61 of reconfiguration of the estimation submodule 42 to not take account of the incorrect measurement previously used as input for the estimation submodule 42, a substep E62 of computation of the difference, after a convergence time $\tau_{cvp}$, between the estimation of said flight parameter and of the measurement derived from the plurality of sensors, for each of the measurements derived from the plurality of sensors, if the absolute value of the difference is less than a predetermined value, the measurement being retained for the estimation module 4.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for monitoring and estimating: parameters relating to a flight of an aircraft (AC); statuses of sensors (C1, C2, ..., CN), the statuses being representative of an operation of said sensors (C1, C2, ..., CN); and a status of a parameter (P1) corresponding to a current weight of the aircraft (AC), the status being representative of a validity of said parameter, the method comprising:

an initialization step (E1), implemented by an initialization module, including initializing the statuses of sensors (C1, C2, ..., CN) configured to determine flight parameters of the aircraft (AC) and the status of the parameter (P1) corresponding to the current weight of the aircraft (AC) and initializing parameters used in an implementation of a monitoring and estimation device;

the method further comprising the following steps, implemented iteratively:

an estimation step (E2), implemented by an estimation module, including determining an estimation of values of the parameters relating to the flight of the aircraft (AC) and an estimation of an error of said weight, from:
measurements of the parameters relating to the flight supplied by the sensors (C1, C2, ..., CN);
parameters relating to the flight initialized in the initialization step (E1) or estimated on the preceding iteration of the estimation step (E2); and
statuses associated with each of said sensors (C1, C2, ..., CN), the estimation step (E2) further comprising generating residues ($r_i$) which are functions of the measured and estimated values of the parameters relating to the flight and of innovation terms;

a first transmission step (E3), implemented by a first transmission module, including:
transmitting to a user device and to a detection module a signal representative of the estimation of the values of the parameters relating to the flight of the aircraft (AC) and of the estimation of the error of the current weight parameter, determined in the estimation step (E2),
sending to said detection module a signal representative of the residues generated in the estimation step (E2);

a detection step (E4), implemented by a detection module, including determining different statuses associated with each of said sensors (C1, C2, ..., CN) and with the parameter (P1) corresponding to the current weight of the aircraft (AC), from:
the estimation of the values of the residues ($r_i$) determined in the estimation step (E2);
the estimation of the values of the parameters relating to the flight of the aircraft (AC) determined in the estimation step (E2);
the measurements of the parameters relating to the flight supplied by the sensors (C1, C2, ..., CN);
the estimation of the error of the current weight parameter (P1) determined in the estimation step (E2); and
the statuses determined on the preceding iteration of the detection step (E4) or initialized in the initialization step (E1); and a second transmission step (E5), implemented by a second transmission module, including transmitting to the user device and, on the next iteration, to the estimation module the different statuses associated with each of said sensors (C1, C2, ..., CN) and the status associated with said parameter (P1) corresponding to the current weight, wherein the estimation step (E2) comprises the following substeps:

an adaptation substep (E21), implemented by an adaptation submodule, including determining a variance and/or a validity Boolean associated with each of the measurements of the parameters relating to the flight supplied by the sensors (C1, C2, ..., CN) and of the setting parameters associated with the estimation algorithm used in an estimation substep (E22), from:
said measurements of the parameters relating to the flight, and
the statuses associated with each of said sensors (C1, C2, ..., CN);

the adaptation substep (E21) further comprising correcting the current weight from a weight error estimated on the preceding iteration or initialized in the initialization step (E1), and from a status associated with the parameter (P1) corresponding to the weight;

an estimation substep (E22), implemented by an estimation submodule, including determining the estimation of the values of the parameters relating to the flight and an estimation of the error of said weight, from:
the measurements of the parameters relating to the flight supplied by said sensors (C1, C2, ..., CN);
the parameters relating to the flight estimated on the preceding iteration or initialized in the initialization step (E1); and
the variance and/or the validity Boolean of each of the measurements of the parameters relating to the flight and of the setting parameters determined in the adaptation substep (E21),
the estimation substep (E22) further comprising generating the residues from the estimated and measured parameters relating to the flight and from the innovation terms, and
wherein the estimation substep (E22) corresponds to an extended Kalman filter associated with a state vector (X), an observation vector (Y) and an auxiliary measurement vector (Z),
the auxiliary measurement vector (Z) having for expression:

$$Z = \left(i_{H_m}, \delta_{qi_m}, \delta_{sp_{i_m}}, \psi_m, \varphi_m, \theta_m, n_{X_{1_m}}, m, conf, V_{gx_{0_m}}, V_{gy_{0_m}}, V_{gz_{0_m}}, z_{g_m}\right),$$

in which:
$i_{H_m}$ corresponds to a measurement of deflection of the horizontal plane, $\delta_{qi_m}$ corresponds to a measurement of deflection of elevators of the aircraft (AC), $\delta_{sp_{i_m}}$ corresponds to a measurement of deflection of spoilers of the aircraft (AC),
$\psi_m$ corresponds to a heading measurement,
$\varphi_m$ corresponds to a list angle measurement,
$\theta_m$ corresponds to an inclination measurement, $n_{X_{1_m}}$ corresponds to a measurement of the longitudinal load factor in the reference frame associated with the aircraft (AC),
m corresponds to the current weight parameter of the aircraft (AC),
conf corresponds to a measurement of configuration of the aircraft (AC), $V_{gx_{0_m}}, V_{gy_{0_m}}, V_{gz_{0_m}}$ correspond to the measurements of the ground speed components in the Earth's reference frame, and
$z_{g_m}$ corresponds to a measurement of geometrical altitude;
the state vector (X) having for expression:

$$X = \begin{pmatrix} W_{x_0} \\ W_{y_0} \\ W_{z_0} \\ \Delta ISA \\ b_{C_L} \\ C_{b_x} \end{pmatrix},$$

in which:
($W_{x_0}$, $W_{y_0}$, $W_{z_0}$) correspond to three components of the speed of the wind in the Earth's reference frame,
$\Delta ISA$ corresponds to a temperature deviation between a current static temperature and a temperature determined from a standard atmosphere model at a current geometrical altitude,
$b_{C_L}$ corresponds to a lift coefficient modelling bias, and
$C_{b_x}$ corresponds to a barometric correction term;
the observation vector (Y) having for expression:

$$Y = \begin{pmatrix} \alpha_m = \operatorname{atan}\left(\frac{w}{u}\right) \\ \beta_m = \operatorname{atan}\left(\frac{v}{\sqrt{u^2 + w^2}}\right) \\ P_{S_m} = \zeta(z_p) \\ n_{Z_{1_m}} = \frac{\gamma SP_s M^2(C_L + b_{C_L})}{2\,mg\,\cos\alpha} + n_{X_{1_m}} \tan\alpha \\ P_{T_m} = P_S\left(1 + \frac{\gamma - 1}{2} M^2\right)^{\frac{\gamma}{\gamma-1}} \\ T_{T_m} = T_S\left(1 + \frac{\gamma - 1}{2} M^2\right) \end{pmatrix},$$

in which:
$\alpha_m$ corresponds to an incidence measurement,
$\beta_m$ corresponds to a side slip measurement,
$P_{S_m}$ corresponds to a static pressure measurement, $n_{Z_{1_m}}$ corresponds to a measurement of vertical load factor in a reference frame associated with the aircraft,
$P_{T_m}$ corresponds to a total pressure measurement,
$T_{T_m}$ corresponds to a total temperature measurement.

2. The method according to claim 1, wherein the detection step (E4) comprises the following substeps:
a substep (E41) of detection of a failing sensor and of incorrect parameters relating to the flight, implemented by a detection submodule, including determining:
the common status associated with the sensor (C1) configured to measure an angle of incidence ($\alpha$) of the aircraft (AC) and with the parameter (P1) corresponding to the current weight; and
the status associated with the other sensors (C2, C3, ..., CN),
from:
the measurements of the parameters relating to the flight supplied by said sensors (C1, ..., CN);

the estimation of the values of the parameters relating to the flight and the weight error;
the statuses associated with each of said sensors (C1, ..., CN) and with the parameter (P1) corresponding to a current weight of the aircraft (AC) determined on the preceding iteration or initialized in the initialization step (E1;) and
the residues ($r_i$);
a substep (E42) of validation of the angle of incidence and of the current weight, implemented by a validation submodule, including determining the status associated with the parameter (P1) corresponding to the current weight and the status associated with the sensor (C1) configured to measure the angle of incidence ($\alpha$), from:
the common status associated with the sensor (C1) configured to measure the angle of incidence ($\alpha$) of the aircraft (AC) and with the parameter (P1) corresponding to the current weight;
the statuses associated with the other sensors (C2, C3, ..., CN);
the estimated parameters relating to the flight;
the estimated weight error;
the measured parameters relating to the flight;
the residues generated in the estimation substep (E22); and
a lift coefficient ($C_L$) supplied from an embedded modelling fed by the parameters relating to the flight estimated and measured by the sensors (C1, C2, ..., CN).

3. The method according to claim 1,
the derivative of the state vector (X) having for expression:

$$\dot{x} = \begin{pmatrix} \dot{W}_{x_0} = 0 \\ \dot{W}_{y_0} = 0 \\ \dot{W}_{z_0} = 0 \\ \Delta \dot{ISA} = 0 \\ \dot{b}_{C_L} = -\dfrac{b_{C_L}}{\tau_b} \\ \dot{C}_{b_x} = 0 \end{pmatrix},$$

in which $\tau_b$ corresponds to a characteristic time associated with a dynamic range of the lift coefficient modelling bias $b_{C_L}$, and
$z_p$ corresponds to the pressure altitude and is expressed according to the equation $$z_p = \frac{z_g}{1 + \dfrac{\Delta ISA}{T_{15}}} - C_{b_x},$$

with $T_{15} = 288.15$ K,
$\zeta$ corresponds to a function linking the measurement of the pressure altitude $z_p$ to the static pressure with the following expression:

$$\begin{cases} \zeta(z_{P_m} \geq z_{P_{11}}) = 10^{log_{10}(P_{11}) + \frac{g(z_{P_{11}} - z_{P_m})}{RT_{11} log(10)}} \\ \zeta(z_{P_m} < z_{P_{11}}) = P_0 \left(1 - \dfrac{G_{T_{z_0}}}{T_{15}} z_{P_m}\right)^{\frac{g}{rG_{T_{z_0}}}} \end{cases},$$

in which:
$Z_{P_{11}} = 11$ km corresponds to the standard altitude of the tropopause,
$P_{11} = 226.321$ mbar and $T_{11} = 216.65$ K correspond to the standard static pressure and static temperature at the tropopause,
$G_{T_{z_0}} = 0.0065$ K/m corresponds to the standard temperature gradient for $z_{P_m} < z_{P_{11}}$,
g corresponds to the acceleration of gravity,
R corresponds to the specific constant of the air,
$T_s$ corresponds to the static temperature parameter and is expressed according to the equation $T_s = T_0 + G_{T_{z_0}} z_g + \Delta ISA$, with $T_0 = 273.15$ K and $G_{T_{z_0}} = 0.0065$ K/m,
V corresponds to the air speed flight parameter and is expressed according to the equation $V = \sqrt{u^2 + v^2 + w^2}$, with each component of the air speed defined in the aircraft reference frame (u, v, w) expressed according to the following expression:

$$\begin{bmatrix} u \\ v \\ w \end{bmatrix} = \begin{bmatrix} \cos\theta\cos\psi & \cos\theta\sin\psi & \sin\theta \\ \sin\varphi\sin\theta\cos\psi - \cos\varphi\sin\psi & \sin\varphi\sin\theta\sin\psi + \cos\varphi\cos\psi & -\sin\varphi\cos\theta \\ \cos\varphi\sin\theta\cos\psi + \sin\varphi\sin\psi & \cos\varphi\sin\theta\sin\psi + \sin\varphi\sin\psi & -\cos\varphi\cos\theta \end{bmatrix} \begin{bmatrix} V_{g_{x_0}} - W_{x_0} \\ V_{g_{y_0}} - W_{y_0} \\ V_{g_{z_0}} - W_{z_0} \end{bmatrix}$$

M corresponds to the Mach number flight parameter computed as a function of the norm of the air speed V according to the equation $$M = \frac{V}{\sqrt{\gamma r T_s}}$$

with r corresponding to the specific constant of the air,
the estimation substep (E22) generating, on an iteration k, the following residues:
a first residue ($r_1$) having for expression at a time $t_k$ $$r_1(t_k) = \varepsilon_\alpha(t_k) + \frac{\hat{b}_{C_z}(t_k)}{C_{z_\alpha}(conf(t_k))}$$

in which:
$\varepsilon_\alpha(t_k)$ corresponds to the innovation term associated with the measurement of the angle of incidence $\alpha$ at the time $t_k$,
$\hat{b}_{C_z}$ corresponds to an estimation of the modelling bias of the lift coefficient $C_z$ at the time $t_k$, and
$C_{z_\alpha}(conf(t_k))$ corresponds to a tabulated value of the lift coefficient depending on a value of a configuration parameter of the aircraft (AC) at the time $t_k$, a second residue ($r_2$) having for expression at the time $$t_k \quad r_2(t_k) = \sqrt{\frac{2}{\gamma-1}\left(\frac{T_{T_m}}{\hat{T}_S(z_{P_m}, t_k)} - 1\right)} - \sqrt{\frac{2}{\gamma-1}\left(\left(\frac{P_{T_m}}{\zeta(z_{P_m})}\right)^{\frac{\gamma-1}{\gamma}} - 1\right)}$$

in which:

$\gamma$ corresponds to the adiabatic coefficient of the air, $T_{T_m}$ corresponds to a total temperature measured by one of the sensors (C2, CN) used as input for the estimation module (4), $P_{T_m}$ corresponds to a total pressure measured by one of the sensors (C2, CN) used as input for the estimation module (4), $z_{P_m}$ corresponds to a pressure altitude measured by one of the sensors (C2, ..., CN) used as input for the estimation module (4), $\zeta$ corresponds to the function linking the measurement of the pressure altitude to the static pressure and $\hat{T}_s(z_{P_m}, t_k)$ corresponds to an estimation of the static temperature computed from parameters relating to the flight estimated at the time $t_k$ on the current iteration and at a time $t_{k-1}$ on a preceding iteration as a function of the first residue ($r_1$) according to the formula:

$$\hat{T}_S(z_{P_m}, t_k) = T_{15} +$$
$$G_{T_{20}}(z_{P_m}(t_k) + \mathcal{L}(s)[\hat{C}_{b_x}(t_k)\Pi_{r_1^\pm}(r_1(t_k)) + \hat{C}_{b_x}(t_{k-1})(1 - \Pi_{r_1^\pm}(r_1(t_k)))]) +$$
$$\mathcal{L}(s)[\overline{\Delta ISA}(t_k)\Pi_{r_1^\pm}(r_1(t_k)) + \overline{\Delta ISA}(t_{k-1})(1 - \Pi_{r_1^\pm}(r_1(t_k)))],$$

in which $\mathcal{L}$ is the transfer function of a low-pass filter and $$\Pi_{r_1^\pm}(r) = H\left(r + \frac{r_1^\pm}{2}\right) - H\left(r - \frac{r_1^\pm}{2}\right)$$

where H is the Heaviside function, and $r_1^\pm$ corresponds to the limits associated with the residue $r_1$;

a third residue ($r_3$) having for expression at the time $$t_k r_3(t_k) = \sqrt{\frac{2}{\gamma-1}\left(\frac{T_{T_m}}{\hat{T}_s(z_{P_m}, t_k)} - 1\right)} - \sqrt{\frac{2}{\gamma-1}\left(\frac{2mgn_{z_{1_m}}\cos\alpha_m}{\gamma S \zeta(z_{P_m})\hat{C}_z} - n_{X_{1_m}}\tan\alpha_m\right)}$$

in which:

m corresponds to the weight of the aircraft (AC),

S corresponds to the reference surface of the aircraft (AC), g corresponds to the acceleration of gravity, $n_{Z_{1_m}}$ corresponds to a vertical load factor, $n_{X_{1_m}}$ corresponds to a longitudinal load factor, $\hat{C}_Z$ corresponds to the estimated lift coefficient, obtained from the estimated and measured parameters relating to the flight and from the configuration of the aircraft (AC).

4. The method according to claim 3, wherein the observation vector (Y) has for expression:

$$Y = \begin{cases} \alpha_m = \operatorname{atan}\left(\frac{w}{u}\right) \\ \beta_m = \operatorname{atan}\left(\frac{v}{\sqrt{u^2 + w^2}}\right) \\ P_{S_m} = \zeta(z_p) \\ n_{Z_m} = \frac{SP_d(C_L + b_{C_L})}{mg\cos\alpha} + n_{X_{1_m}}\tan\alpha \\ P_{T_m} = P_S\left(1 + \frac{\gamma-1}{3}M^2\right)^{\frac{\gamma}{\gamma-1}} \\ T_{T_m} = T_S\left(1 + \frac{\gamma-1}{2}M^2\right) \\ P_{T_{eng}} = P_S\left(1 + \frac{\gamma-1}{2}M^2\right)^{\frac{\gamma}{\gamma-1}} \\ P_{S_{eng}} = \zeta(z_p) \\ T_{T_{eng_m}} = T_S\left(1 + \frac{\gamma-1}{2}M^2\right) \end{cases}$$

in which:

$P_{T_{eng}}$ corresponds to a total pressure value derived from an engine-nacelle modelling, $P_{S_{eng}}$ corresponds to a static pressure value derived from the engine-nacelle modelling, and $T_{T_{eng_m}}$ corresponds to a measured total temperature value derived from an engine-nacelle total temperature sensor;

the estimation substep (E22) also generating the following residues:

a fourth residue ($r_4$) having for expression $$r_4(t_k) = \varepsilon_{P_{T_{eng}}}(t_k)$$

in which $$\varepsilon_{P_{T_{eng}}}(t_k)$$

corresponds to the difference between the measured total pressure value and said total pressure value derived from the modelling at a time ($t_k$), a fifth residue ($r_5$) having for expression $$r_5(t_k) = \varepsilon_{P_{S_{eng}}}(t_k) \text{ in which } \varepsilon_{P_{S_{eng}}}(t_k)$$

corresponds to the difference between the measured static pressure value and said static pressure value derived from the modelling at a time ($t_k$), and a sixth residue ($r_6$) having for expression $r_6(t_k) = \varepsilon_{TAT_{eng}}(t_k)$ in which $\varepsilon_{TAT_{eng}}(t_k)$ corresponds to the difference between the measured total temperature value and said total temperature value derived from the engine-nacelle measurement at a time ($t_k$).

5. The method according to claim 3, wherein the estimation substep (E22) corresponds to an extended Kalman filter associated with a state vector (X) and an observation vector (Y) and an auxiliary measurement vector (Z), the auxiliary measurement vector (Z) having for expression:

$$Z = \left( i_{H_m}, \delta_{q_{i_m}}, \delta_{sp_{i_m}}, \psi_m, \varphi_m, \theta_m, n_{x_{1_m}}, m, conf, V_{g_{x_{0_m}}}, V_{g_{y_{0_m}}}, V_{g_{z_{0_m}}}, z_{g_m} \right),$$

in which $$n_{y_{1_m}}$$

corresponds to a measurement of lateral load factor in the reference frame associated with the aircraft, the state vector (X) having for expression:

$$X = \begin{pmatrix} W_{x_0} \\ W_{y_0} \\ W_{z_0} \\ \Delta ISA \\ b_{C_L} \\ C_{b_x} \\ v_{g_{x_0}} \\ v_{g_{y_0}} \\ v_{g_{z_0}} \\ b_{n_{x_1}} \\ b_{n_{y_1}} \\ b_{n_{z_1}} \\ z_G \end{pmatrix},$$

in which:

$$V_{g_{x_0}}, V_{g_{y_0}}, V_{g_{z_0}}$$

correspond to the three components of the ground speed in the Earth's reference frame, $$b_{n_{x_1}}, b_{n_{y_1}}, b_{n_{z_1}}$$

correspond to the three bias components of accelerometers in the reference frame associated with the aircraft (AC), $z_G$ corresponds to a geometrical altitude;

the derivative of the state vector (X) having for expression:

$$\dot{X} = \begin{pmatrix} \dot{W}_{x_0} = 0 \\ \dot{W}_{y_0} = 0 \\ \dot{W}_{z_0} = 0 \\ \Delta I \dot{S} A = 0 \\ \dot{b}_{C_L} = -\frac{b_{C_L}}{\tau_b} \\ \dot{C}_{b_x} = 0 \\ \dot{v}_{g_{x_0}} \\ \dot{v}_{g_{y_0}} = -g * M_{rot} \begin{pmatrix} (n_{x_{1_m}} + b_{nx})\sin\theta \\ (n_{y_{1_m}} + b_{ny})\cos\theta\sin\phi \\ (n_{z_{1_m}} + b_{nz})\cos\theta\cos\phi \end{pmatrix} \\ \dot{v}_{g_{z_0}} \\ \dot{b}_{n_{x_1}} = 0 \\ \dot{b}_{n_{y_1}} = 0 \\ \dot{b}_{n_{z_1}} = 0 \\ \dot{z}_G = V_{g_{z_0}} \end{pmatrix},$$

in which:

$M_{rot}$ corresponds to a standard matrix of rotation of the Earth's reference frame to the reference frame associated with the aircraft (AC) and has for expression $$M_{rot} = \begin{pmatrix} \cos\theta\cos\psi & \sin\phi\sin\theta\cos\psi - \cos\phi\sin\psi & \cos\phi\sin\theta\cos\psi + \sin\phi\sin\psi \\ \cos\theta\sin\psi & \sin\phi\sin\theta\sin\psi + \cos\phi\cos\psi & \cos\phi\sin\theta\sin\psi - \sin\phi\cos\psi \\ \sin\theta & -\sin\phi\cos\theta & -\cos\phi\cos\theta \end{pmatrix},$$

the observation vector (Y) having for expression:

$$Y = \begin{pmatrix} \alpha_m = \operatorname{atan}\left(\frac{w}{u}\right) \\ \beta_m = \operatorname{atan}\left(\frac{v}{\sqrt{u^2+w^2}}\right) \\ P_{S_m} = \zeta(z_p) \\ n_{Z_{1_m}} = \frac{SP_d(C_L + b_{C_L})}{\operatorname{mgcos}\alpha} + n_{X_{1_m}}\tan\alpha \\ P_{T_m} = P_S\left(1 + \frac{\gamma-1}{3}M^2\right)^{\frac{\gamma}{\gamma-1}} \\ T_{T_m} = T_S\left(1 + \frac{\gamma-1}{2}M^2\right) \\ M_{eng} = \frac{v}{\sqrt{\gamma r T_s}} \\ P_{S_{eng}} = \zeta(z_p) \\ T_{T_{eng_m}} = T_S\left(1 + \frac{\gamma-1}{2}M^2\right) \\ V_{gx_{0_m}} = V_{gx_0} \\ V_{gy_{0_m}} = V_{gy_0} \\ V_{gz_{0_m}} = V_{gz_0} \\ z_{G_m} = z_G \end{pmatrix},$$

in which:

$V_{gx_{0_m}}, V_{gy_{0_m}}, V_{gz_{0_m}}$ correspond to measurements of the three components of the ground speed, and $z_{G_m}$ corresponds to a measurement of the geometrical altitude.

6. The method according to claim 5, wherein the lateral component v of the air speed V is assumed nil.

7. The method according to claim 2, wherein the determination of the common status and of the status associated with the other sensors of the failing sensor detection substep (E41) comprises the following substeps:

a substep (E411) of assignment to each residue of a maximum limit ($r_i^+$) and a minimum limit ($r_i^-$) from the estimated flight parameters;

the substep (E411) being also a substep of construction of a first validity indicator ($V_{P_S}$) associated with the static pressure sensor and of a second validity indicator ($V_{P_T}$) associated with the total pressure sensor from the estimated parameters and the measurements derived from the sensors of the aircraft:

the first validity indicator ($V_{P_S}$) having the value 1 if the relationship $|\mathcal{L}_h(s)(z_{P_m}-z_{G_m})| \leq l_{P_S}$ is borne out, the first validity indicator ($V_{P_S}$) having the value 0 if the relationship $|\mathcal{L}_h(s)(z_{P_m}-z_{G_m})| \leq l_{P_S}$ is not borne out, in which $l_{P_S}$ corresponds to a limit determined experimentally as a function of the dynamics of the aircraft (AC), $\mathcal{L}_h$ corresponding to the transfer function of a high-pass filter, the second validity indicator ($V_{P_T}$) having the value 0 by default and 1 if the residue $r_1$ crosses its respective limits, at an instant $t_k$, determined later and that $\exists\, n \in \mathbb{N}$ such that $t_n \in [t_k - \tau_{P_T}, t_k]$ bearing out $|(1-\mathcal{L}_\tau)(M_{P_T}(t_n) - M_{P_T}(t_{n-j}))| \leq l_{P_T}$, with $\tau_{P_T}$ a time constant, $\mathcal{L}_\tau$ a transfer function of a low-pass filter having for time constant $\tau$, $j \in \mathbb{N}$ a constant, and $l_{P_T}$ a limit determined experimentally as a function of the dynamics of the aeroplane;

residue indicators ($R_i$) being computed and associated with each residue ($r_j$) and validity indicators ($V_k$);

a substep (E412) of identification of the occurrence of failures when the sum of the residue indicators ($\Sigma R_i$) is strictly greater than zero and identification, in case of failure, of the faulty sensor by comparing the current values of the residue indicators to those itemized in a table identified offline and online itemizing the failure cases as a function of the different combinations of values of the residue indicators ($R_i$).

8. The method according to claim 1, wherein the statuses associated with each of said sensors (C1, C2, . . . , CN) are also determined from auxiliary statuses associated with each of said sensors configured to be sent to the detection module by a monitoring module.

9. The method according to claim 1, wherein, for a measured consolidated flight parameter from a plurality of sensors, the method comprises the following substeps implemented by a unitary verification module, when a failure is detected for a sensor measuring said flight parameter for which said measurement is used as input for the estimation module:

a substep (E61) of reconfiguration of the estimation submodule to not take account of the incorrect measurement of the flight parameter used hitherto in the estimation substep (E22), a substep (E62) of computation of the difference between the estimation of said flight parameter and of the measurement of one of said sensors derived from the plurality of sensors, for each of the measurements derived from the plurality of sensors, if the absolute value of the difference is less than a predetermined value, the measurement being retained in the estimation substep (E22).

10. A device for monitoring and estimating: parameters relating to a flight of an aircraft (AC); statuses of sensors, the statutes being representative of an operation of said sensors (C1, C2, . . . , CN); and a status of a parameter (P1) corresponding to a current weight of the aircraft (AC), the status being representative of a validity of said parameter (P1), wherein the device comprises:

an initialization module, configured to initialize the statuses of sensors (C1, C2, . . . , CN) configured to determine parameters relating to the flight of the aircraft (AC) and the status of the parameter (P1) corresponding to the current weight of the aircraft and to initialize parameters used in the implementation of the monitoring and estimation device;

wherein the monitoring and estimation device further comprises the following modules, implemented iteratively:

an estimation module, configured to determine an estimation of values of the parameters relating to the flight of the aircraft (AC) and an estimation of an error of the current weight parameter (P1), from:

measurements of the parameters relating to the flight supplied by the sensors (C1, C2, . . . , CN), parameters relating to the flight initialized in the initialization step (E1) or estimated on the preceding iteration of the estimation step (E2) and statuses associated with each of said sensors (C1, C2, . . . , CN), the estimation module being also configured to generate residues ($r_i$) which are functions of the measured and estimated values of the parameters relating to the flight and of innovation terms;

a first transmission module configured to:
  transmit to a user device and to a detection module a signal representative of the estimation of the values of the parameters relating to the flight of the aircraft (AC) and of the estimation of the error of the current weight parameter (P1), determined in the estimation step (E2),
  send a signal representative of the residues generated in the estimation step (E2) to said detection module;
the detection module configured to determine the different statuses associated with each of said sensors (C1, C2, ..., CN) and with the parameter (P1) corresponding to the current weight of the aircraft (AC), from:
  the estimation of the values of the residues determined in the estimation step (E2),
  the estimation of the values of the parameters relating to the flight of the aircraft (AC) determined in the estimation step (E2),
  the measurements of the parameters relating to the flight supplied by the sensors (C1, C2, ..., CN),
  the estimation of the error of the current weight parameter (P1) determined by the estimation module (4),
  said statuses determined on the preceding iteration or initialized in the initialization step (E1); and
a second transmission module configured to transmit to the user device and, on the next iteration, to the estimation module the different statuses associated with each of said sensors (C1, C2, ..., CN) and the status associated with said parameter (P1) corresponding to the current weight,
wherein the estimation module comprises:
an adaptation submodule configured to determine a variance and/or a validity Boolean associated with each of the measurements of the parameters relating to the flight supplied by the sensors (C1, C2, ..., CN) and of the setting parameters associated with the estimation algorithm used in an estimation submodule, from:
  said measurements of the parameters relating to the flight and
  the statuses associated with each of said sensors (C1, C2, ..., CN);
wherein the adaptation submodule is also configured to correct the current weight of the aircraft (AC) from a weight error estimated on the preceding iteration or initialized by the initialization module, and from a status associated with the parameter (P1) corresponding to the weight,
wherein the estimation submodule is configured to determine the estimation of the values of the parameters relating to the flight and an estimation of the error of said weight, from:
  the measurements of the parameters relating to the flight supplied by said sensors (C1, C2, ..., CN),
  the parameters relating to the flight estimated on the preceding iteration or initialized in the initialization step (E1), and
  the variance and/or the validity Boolean of each of the measurements of the parameters relating to the flight and of the setting parameters determined in the adaptation substep (E21),
wherein the estimation submodule is also configured to generate residues from the estimated and measured parameters relating to the flight and from the innovation terms, and wherein the estimation substep (E22) corresponds to an extended Kalman filter associated with a state vector (X), an observation vector (Y) and an auxiliary measurement vector (Z),
the auxiliary measurement vector (Z) having for expression:

$$Z = \left(i_{H_m}, \delta_{qi_m}, \delta_{sp i_m}, \psi_m, \varphi_m, \theta_m, n_{X_{1_m}}, m, conf, V_{gx_{0_m}}, V_{gy_{0_m}}, V_{gz_{0_m}}, z_{g_m}\right),$$

in which:
  $i_{H_m}$ corresponds to a measurement of deflection of the horizontal plane, $\delta_{qi_m}$ corresponds to a measurement of deflection of elevators of the aircraft (AC), $\delta_{sp i_m}$ corresponds to a measurement of deflection of spoilers of the aircraft (AC),
  $\psi_m$ corresponds to a heading measurement,
  $\varphi_m$ corresponds to a list angle measurement,
  $\theta_m$ corresponds to an inclination measurement, $n_{X_{1_m}}$ corresponds to a measurement of the longitudinal load factor in the reference frame associated with the aircraft (AC),
  m corresponds to the current weight parameter of the aircraft (AC),
  conf corresponds to a measurement of configuration of the aircraft (AC), $V_{gx_{0_m}}, V_{gy_{0_m}}, V_{gz_{0_m}}$ correspond to the measurements of the ground speed components in the Earth's reference frame, and
  $z_{g_m}$ corresponds to a measurement of geometrical altitude;
the state vector (X) having for expression:

$$X = \begin{pmatrix} W_{x_0} \\ W_{y_0} \\ W_{z_0} \\ \Delta ISA \\ b_{C_L} \\ C_{b_x} \end{pmatrix},$$

in which:
  $(W_{x_0}, W_{y_0}, W_{z_0})$ correspond to three components of the speed of the wind in the Earth's reference frame, ΔISA corresponds to a temperature deviation between a current static temperature and a temperature determined from a standard atmosphere model at a current geometrical altitude,
$b_{C_L}$ corresponds to a lift coefficient modelling bias, and
$C_{b_x}$ corresponds to a barometric correction term;
the observation vector (Y) having for expression:

$$Y = \begin{pmatrix} \alpha_m = \mathrm{atan}\left(\dfrac{w}{u}\right) \\ \beta_m = \mathrm{atan}\left(\dfrac{v}{\sqrt{u^2+w^2}}\right) \\ P_{S_m} = \zeta(z_p) \\ n_{Z_{1_m}} = \dfrac{\gamma S P_s M^2 (C_L + b_{C_L})}{2\ \mathrm{mg}\ \cos\alpha} + n_{X_{1_m}} \tan\alpha \\ P_{T_m} = P_S\left(1 + \dfrac{\gamma-1}{2}M^2\right)^{\frac{\gamma}{\gamma-1}} \\ T_{T_m} = T_s\left(1 + \dfrac{\gamma-1}{2}M^2\right) \end{pmatrix},$$

in which:
$\alpha_m$ corresponds to an incidence measurement,
$\beta_m$ corresponds to a side slip measurement,
$P_{S_m}$ corresponds to a static pressure measurement, $n_{Z_{1_m}}$ corresponds to a measurement of vertical load factor in a reference frame associated with the aircraft,
$P_{T_m}$ corresponds to a total pressure measurement,
$T_{T_m}$ corresponds to a total temperature measurement.

11. The device according to claim 10, wherein the detection module comprises:
a detection submodule configured to determine:
the common status associated with the sensor (C1) configured to measure an angle of incidence (α) of the aircraft (AC) and with the parameter (P1) corresponding to the current weight, and
the status associated with the other sensors (C2, C3, . . . , CN),
from:
the measurements of the parameters relating to the flight supplied by said sensors (C2, C3, . . . , CN),
the estimation of the values of the parameters relating to the flight and the weight error,
the statuses associated with each of said sensors (C2, C3, . . . , CN) and with a parameter (P1) corresponding to a current weight of the aircraft (AC) determined on the preceding iteration or initialized by the initialization module,
the residues; and
a validation submodule configured to determine the status associated with the parameter (P1) corresponding to the current weight and the status associated with the sensor (C1) configured to measure the angle of incidence (α), from:
the common status associated with the sensor (C1) configured to measure the angle of incidence (α) of the aircraft (AC) and with the parameter (P1) corresponding to the current weight,
the statuses associated with the other sensors (C2, C3, . . . , CN),
the estimated parameters relating to the flight,
the estimated weight error,
the measured parameters relating to the flight,
the residues generated in the estimation substep (E22), and
a lift coefficient ($C_L$) supplied from an embedded modelling fed by the parameters relating to the flight estimated and measured by said sensors (C1, C2, . . . , CN).

12. An aircraft comprising a device for monitoring and estimating flight parameters of an aircraft (AC), according to claim 10.

* * * * *